United States Patent
Nishi et al.

(10) Patent No.: US 11,166,026 B2
(45) Date of Patent: Nov. 2, 2021

(54) ENCODER, DECODER, ENCODING METHOD, AND DECODING METHOD

(71) Applicant: Panasonic Intellectual Property Corporation of America, Torrance, CA (US)

(72) Inventors: Takahiro Nishi, Nara (JP); Tadamasa Toma, Osaka (JP); Kiyofumi Abe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/192,070

(22) Filed: Nov. 15, 2018

(65) Prior Publication Data

US 2019/0089958 A1 Mar. 21, 2019

Related U.S. Application Data

(63) Continuation of application No. PCT/JP2017/017629, filed on May 10, 2017.
(Continued)

(51) Int. Cl.
*H04N 19/13* (2014.01)
*H04N 19/70* (2014.01)
(Continued)

(52) U.S. Cl.
CPC .......... *H04N 19/13* (2014.11); *H04N 19/124* (2014.11); *H04N 19/159* (2014.11);
(Continued)

(58) Field of Classification Search
CPC ............................... H04N 19/13; H04N 19/70
(Continued)

(56) References Cited

U.S. PATENT DOCUMENTS

| | | | | |
|---|---|---|---|---|
| 2010/0259427 A1* | 10/2010 | Otsuka | .................... | G06T 9/005 341/107 |
| 2012/0328207 A1* | 12/2012 | Sasai | .................... | H04N 19/103 382/233 |

(Continued)

FOREIGN PATENT DOCUMENTS

| | | |
|---|---|---|
| JP | 2015-504256 | 2/2015 |
| WO | 2013/108639 | 7/2013 |
| WO | 2015/008478 | 1/2015 |

OTHER PUBLICATIONS

International Search Report (ISR) dated Jul. 4, 2017 in International (PCT) Application No. PCT/JP2017/017629.
(Continued)

*Primary Examiner* — Jeffery A Williams
(74) *Attorney, Agent, or Firm* — Wenderoth, Lind & Ponack, L.L.P.

(57) ABSTRACT

An encoder is an encoder which encodes image information and includes memory and circuitry accessible to the memory. The circuitry derives, from the image information, a binary data string according to binarization for arithmetic encoding, and outputs a bit stream including the binary data string and application information indicating whether or not the binary data string has been arithmetic encoded. The circuitry outputs, as the bit stream, a string including as the binary data string, a data string which has not been arithmetic encoded; and, as the application information, information indicating that the binary data string has not been arithmetic encoded.

10 Claims, 25 Drawing Sheets

Related U.S. Application Data

(60) Provisional application No. 62/339,212, filed on May 20, 2016.

(51) Int. Cl.
*H04N 19/172* (2014.01)
*H04N 19/174* (2014.01)
*H04N 19/91* (2014.01)
*H04N 19/124* (2014.01)
*H04N 19/159* (2014.01)

(52) U.S. Cl.
CPC ......... *H04N 19/172* (2014.11); *H04N 19/174* (2014.11); *H04N 19/70* (2014.11); *H04N 19/91* (2014.11)

(58) Field of Classification Search
USPC .................................................... 375/240.02
See application file for complete search history.

(56) References Cited

U.S. PATENT DOCUMENTS

2013/0177069 A1   7/2013   Sze et al.
2019/0020877 A1*  1/2019   Yamato .................. H04N 19/70

OTHER PUBLICATIONS

H.265 (ISO/IEC 23008-2 HEVC (High Efficiency Video Coding)), Dec. 1, 2013.
Ryoji Hattori, et al., "Fast bypass mode for CABAC", 2012 Picture Coding Symposium, May 7, 2012, pp. 417-420.
Official Communication dated Jul. 30, 2020 for the corresponding European Patent Application No. 17799225.2.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$<br>WHERE $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$<br>WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ | ns
ENCODER, DECODER, ENCODING METHOD, AND DECODING METHOD

CROSS REFERENCE TO RELATED APPLICATIONS

This application is a U.S. continuation application of PCT International Patent Application Number PCT/JP2017/017629 filed on May 10, 2017, claiming the benefit of priority of U.S. Provisional Patent Application No. 62/339,212 filed on May 20, 2016, the entire contents of which are hereby incorporated by reference.

BACKGROUND

1. Technical Field

The present disclosure relates to an encoder which encodes image information, and to others.

2. Description of the Related Art

In H.265 (ISO/IEC 23008-2 HEVC (High Efficiency Video Coding)) which is a conventional encoding method, arithmetic encoding is used to encode image information efficiently.

SUMMARY

However, processing delay generated by arithmetic encoding or arithmetic decoding may make it difficult to encode or decode image information in a short time.

In view of this, the present disclosure provides an encoder, etc. capable of supporting reduction in processing delay generated by arithmetic encoding, etc.

An encoder according to an aspect of the present disclosure is an encoder which encodes image information and includes: memory; and circuitry which is accessible to the memory and which: derives, from the image information, a binary data string according to binarization for arithmetic encoding; and outputs a bit stream including the binary data string and application information indicating whether or not the binary data string has been arithmetic encoded, wherein the circuitry outputs, as the bit stream, a string including: as the binary data string, a data string which has not been arithmetic encoded; and, as the application information, information indicating that the binary data string has not been arithmetic encoded.

These general and specific aspects may be implemented using a system, an apparatus, a method, an integrated circuit, a computer program, or a computer-readable recording medium such as a CD-ROM, or any combination of systems, apparatuses, methods, integrated circuits, computer programs, or computer-readable recording media.

The encoder, etc. according to an aspect of the present disclosure is capable of supporting reduction in processing delay generated by arithmetic encoding, etc.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

Figure 1:
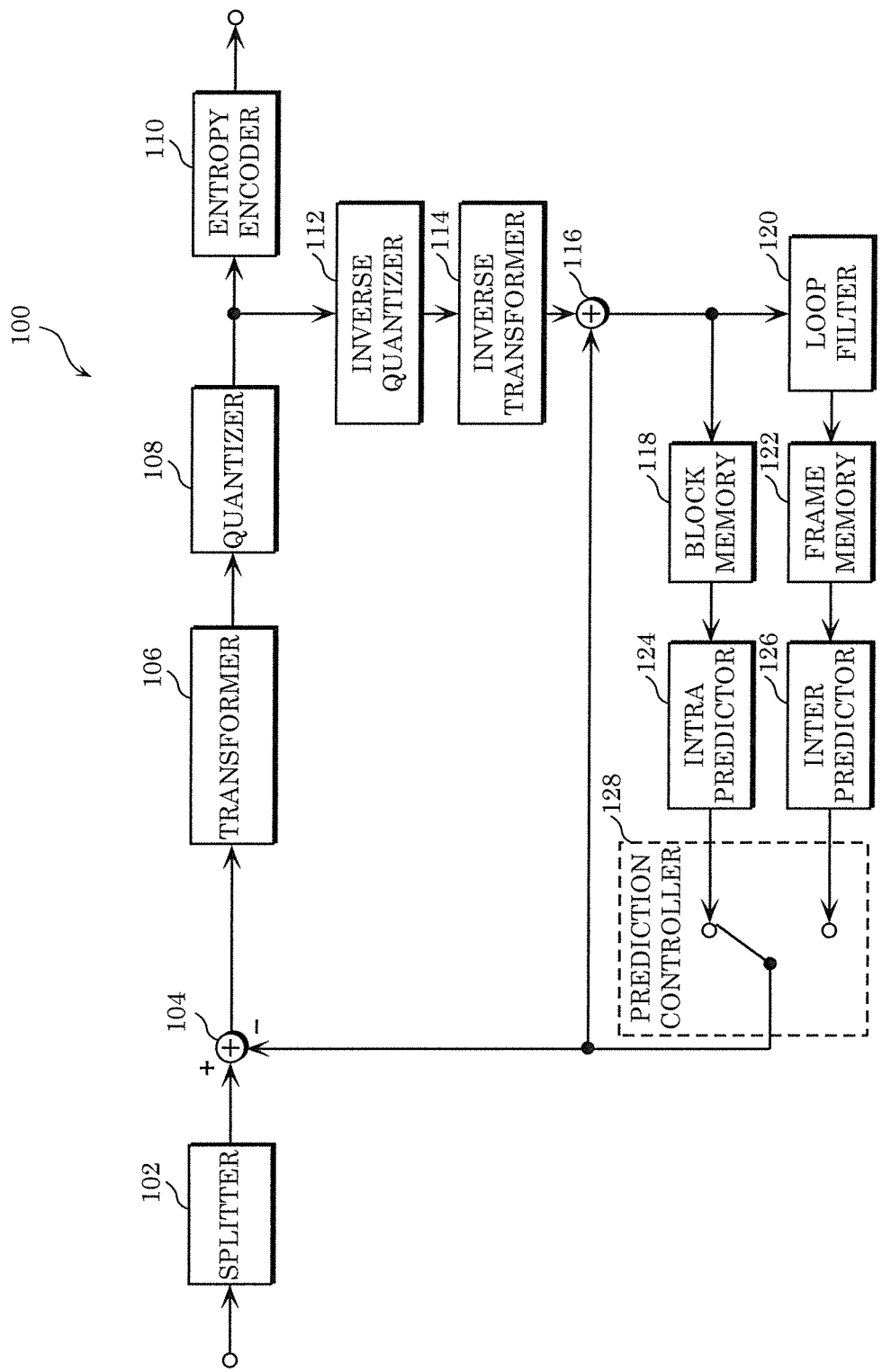
FIG. 1 is a block diagram illustrating a functional configuration of the encoding device according to Embodiment 1.

DETAILED DESCRIPTION OF THE EMBODIMENTS (Underlying Knowledge Forming Basis of the Present Disclosure)

In H.265 which is a conventional encoding method, arithmetic encoding is used to encode image information efficiently. Specifically, a context-based adaptive binary arithmetic coding method referred to as CABAC is employed.

For example, in the context-based adaptive binary arithmetic coding method, multi-value signals are converted, by binarization, into a binary data string which is a data string in which each of values are represented as 0 or 1. According to context such as a data type, or the like, an occurrence probability of 0 or 1 is selected from among a plurality of predetermined occurrence probabilities, and the binary data string is binary arithmetic encoded according to the selected occurrence probability. The occurrence probability is updated according to the value of 0 or 1 included in the binary data string.

In other words, in the context-based adaptive binary arithmetic coding method, binary arithmetic encoding is performed according to a variable occurrence probability. In addition, in the context-based adaptive binary arithmetic coding method, data having a particular data type, or the like is binary arithmetic encoded according to a fixed occurrence probability.

Such arithmetic encoding achieves a high coding efficiency. In other words, such arithmetic encoding achieves a high compression rate.

However, complicated processing is performed in such arithmetic encoding and arithmetic decoding corresponding to the arithmetic encoding, which generates processing delay. Accordingly, it is difficult to encode or decode image information in a short time.

An encoder according to an aspect of the present disclosure is an encoder which encodes image information and includes: memory; and circuitry which is accessible to the memory and which: derives, from the image information, a binary data string according to binarization for arithmetic encoding; and outputs a bit stream including the binary data string and application information indicating whether or not the binary data string has been arithmetic encoded, wherein the circuitry outputs, as the bit stream, a string including: as the binary data string, a data string which has not been arithmetic encoded; and, as the application information, information indicating that the binary data string has not been arithmetic encoded.

In this way, the encoder is capable of skipping arithmetic encoding. Accordingly the encoder can support reduction in processing delay generated by the arithmetic encoding. In addition, the encoder can effectively utilize binarization resources for arithmetic encoding. In addition, the encoder is capable of outputting the bit stream including application information for distinguishing an application state of arithmetic encoding.

For example, the circuitry may switch between a first operation and a second operation. The first operation is for outputting, as the bit stream, a first bit stream including: as the binary data string, a first binary data string which has been arithmetic encoded; and, as the application information, first information indicating that the binary data string has been arithmetic encoded. The second operation is for outputting, as the bit stream, a second bit stream including: as the binary data string, a second binary data string which has not been arithmetic encoded; and, as the application information, second information indicating that the binary data string has not been arithmetic encoded.

In this way the encoder is capable of adaptively skipping arithmetic encoding by adaptively switching whether or not to perform arithmetic encoding.

In addition, for example, the circuitry may output the bit stream including the application information which indicates, in units of at least one entire picture, whether or not the binary data string has been arithmetic encoded.

In this way the encoder is capable of reducing increase in coding amount and processing amount required for the application information.

In addition, an encoder according to an aspect of the present disclosure may be an encoder which encodes image information and includes: memory; and circuitry which is accessible to the memory and which: derives, from the image information, a binary data string according to binarization for arithmetic encoding; and outputs a bit stream including the binary data string, wherein the circuitry switches between a first operation and a second operation, the first operation being for outputting, as the bit stream, a first bit stream which includes, as the binary data string, a first binary data string which has been arithmetic encoded, the second operation being for outputting, as the bit stream, a second bit stream which includes, as the binary data string, a second binary data string which has not been arithmetic encoded.

In this way the encoder is capable of adaptively skipping arithmetic encoding by adaptively switching whether or not to perform arithmetic encoding. Accordingly, the encoder can support reduction in processing delay generated by the arithmetic encoding. In addition, the encoder can effectively utilize binarization resources for arithmetic encoding.

For example, the circuitry may output the bit stream including the binary data string and application information indicating whether or not the binary data string has been arithmetic encoded, wherein the circuitry may switch between a first operation and a second operation. The first operation is for outputting, as the bit stream, a first bit stream including: as the binary data string, a first binary data string which has been arithmetic encoded; and, as the application information, first information indicating that the binary data string has been arithmetic encoded. The second operation is for outputting, as the bit stream, a second bit stream including: as the binary data string, a second binary data string which has not been arithmetic encoded; and, as the application information, second information indicating that the binary data string has not been arithmetic encoded.

In addition, the encoder is capable of outputting the bit stream including the application information for distinguishing the application state of arithmetic encoding.

In addition, for example, the circuitry may switch between the first operation and the second operation in units of at least one entire picture.

In this way the encoder is capable of reducing increase in processing amount required for switching between the application states of arithmetic encoding.

In addition, a decoder according to an aspect of the present disclosure is a decoder which decodes image information and includes: memory; and circuitry which is accessible to the memory and which obtains a bit stream which includes: a binary data string which has been derived from the image information according to binarization for arithmetic encoding; and application information indicating whether or not the binary data string has been arithmetic encoded; and derives the image information from a data string which has not been arithmetic encoded and which has been included as the binary data string in the bit stream including, as the application information, information indicating that the binary data string has not been arithmetic encoded.

In this way the decoder is capable of skipping arithmetic decoding. Accordingly, the decoder can support reduction in processing delay generated by the arithmetic decoding. In addition, the decoder can effectively utilize inverse binarization resources for arithmetic decoding. In addition, the decoder is capable of deriving image information from the bit stream including application information for distinguishing the application state of arithmetic encoding.

For example, the circuitry may switch between a first operation and a second operation. The first operation is for deriving the image information from a first binary data string which has been arithmetic encoded and which has been included as the binary data string in the bit stream which includes, as the application information, first information indicating that the binary data string has been arithmetic encoded. The second operation is for deriving the image information from a second binary data string which has not been arithmetic encoded and which has been included as the binary data string in the bit stream which includes, as the application information, second information indicating that the binary data string has not been arithmetic encoded.

In this way the decoder is capable of adaptively skipping arithmetic decoding by adaptively switching whether or not to perform arithmetic decoding.

In addition, for example, the circuitry may obtain the bit stream including the application information which indicates, in units of at least one entire picture, whether or not the binary data string has been arithmetic encoded.

In this way, the decoder is capable of reducing increase in coding amount and processing amount required for the application information.

In addition, a decoder according to an aspect of the present disclosure may be a decoder which decodes image information and includes: memory; and circuitry which is accessible to the memory and which: obtains a bit stream including a binary data string derived from the image information according to binarization for arithmetic encoding; and derives the image information from the binary data string, wherein the circuitry switches between a first operation and a second operation, the first operation being for deriving the image information from a first binary data string which has been arithmetic encoded and which has been included as the binary data string in the bit stream, the second operation being for deriving the image information from a second binary data string which has not been arithmetic encoded and which has been included as the binary data string in the bit stream.

In this way, the decoder is capable of adaptively skipping arithmetic decoding by adaptively switching whether or not to perform arithmetic decoding. Accordingly the decoder can support reduction in processing delay generated by the arithmetic decoding. In addition, the decoder can effectively utilize inverse binarization resources for arithmetic decoding.

For example, the circuitry: may obtain the bit stream including the binary data string and application information indicating whether or not the binary data string has been arithmetic encoded; and may switch between the first operation and the second operation. The first operation is for deriving the image information from the first binary data string which has been arithmetic encoded and which has been included as the binary data string in the bit stream which includes, as the application information, first information indicating that the binary data string has been arithmetic encoded. The second operation is for deriving the image information from the second binary data string which has not been arithmetic encoded and which has been included as the binary data string in the bit stream which includes, as the application information, second information indicating that the binary data string has not been arithmetic encoded.

In this way the decoder is capable of obtaining the bit stream including the application information for distinguishing the application state of arithmetic encoding, and deriving the image information therefrom.

In addition, for example, the circuitry may switch between the first operation and the second operation in units of at least one entire picture.

In this way, the decoder is capable of reducing increase in processing amount required for switching between the application states of arithmetic encoding.

In addition, an encoding method according to an aspect of the present disclosure is an encoding method for encoding image information and includes: deriving, from the image information, a binary data string according to binarization for arithmetic encoding; and outputting a bit stream including the binary data string and application information indicating whether or not the binary data string has been arithmetic encoded, wherein a string output as the bit stream includes: as the binary data string, a data string which has not been arithmetic encoded; and, as the application information, information indicating that the binary data string has not been arithmetic encoded.

In this way, the device, etc. which executes the encoding method is capable of skipping arithmetic encoding. Accordingly the device, etc. which executes the encoding method can support reduction in processing delay generated by the arithmetic encoding. In addition, the device, etc. which executes the encoding method can effectively utilize the binarization resources for arithmetic encoding. In addition, the device, etc. which executes the encoding method is capable of outputting the bit stream including application information for distinguishing the application state of arithmetic encoding.

In addition, an encoding method according to an aspect of the present disclosure may be an encoding method which is for encoding image information and includes: deriving, from the image information, a binary data string according to binarization for arithmetic encoding; and outputting a bit stream including the binary data string, wherein a first operation and a second operation is switched, the first operation being for outputting, as the bit stream, a first bit stream including, as the binary data string, a first binary data string which has been arithmetic encoded, the second operation being for outputting, as the bit stream, a second bit stream including, as the binary data string, a second binary data string which has not been arithmetic encoded.

In this way, the device, etc. which executes the encoding method is capable of adaptively skipping arithmetic encoding by adaptively switching whether or not to perform arithmetic encoding. Accordingly, the device, etc. which executes the encoding method can support reduction in processing delay generated by the arithmetic encoding. In addition, the device, etc. which executes the encoding method can effectively utilize the binarization resources for arithmetic encoding.

In addition, a decoding method according to an aspect of the present disclosure is a decoding method which is for decoding image information and includes: obtaining a bit stream which includes: a binary data string which has been derived from the image information according to binarization for arithmetic encoding; and application information indicating whether or not the binary data string has been arithmetic encoded; and deriving the image information from a data string which has not been arithmetic encoded and which has been included as the binary data string in the bit stream including, as the application information, information indicating that the binary data string has not been arithmetic encoded.

In this way, the device, etc. which executes the decoding method can skip arithmetic decoding. Accordingly, the device, etc. which executes the decoding method can support reduction in processing delay generated by the arithmetic decoding. In addition, the device, etc. which executes the decoding method can effectively utilize inverse binarization resources for arithmetic decoding. In addition, the device, etc. which executes the decoding method is capable of obtaining the bit stream including the application information for distinguishing the application state of arithmetic encoding, and deriving the image information therefrom.

In addition, a decoding method according to an aspect of the present disclosure may be a decoding method which is for decoding image information and includes: obtaining a bit stream including a binary data string derived from the image information according to binarization for arithmetic encoding; and deriving the image information from the binary data string, wherein a first operation and a second operation is switched, the first operation being for deriving the image information from a first binary data string which has been arithmetic encoded and included as the binary data string in the bit stream, the second operation being for deriving the image information from a second binary data string which has not been arithmetic encoded and which has been included as the binary data string in the bit stream.

In this way the decoder, etc. which executes the decoding method is capable of adaptively skipping arithmetic decoding by adaptively switching whether or not to perform arithmetic decoding. Accordingly, the device, etc. which executes the decoding method can support reduction in processing delay generated by the arithmetic decoding. In addition, the device, etc. which executes the decoding method can effectively utilize the inverse binarization resources for arithmetic decoding.

Furthermore, these general and specific aspects may be implemented using a system, an apparatus, a method, an integrated circuit, a computer program, or a computer-readable recording medium such as a CD-ROM, or any combination of systems, apparatuses, methods, integrated circuits, computer programs, or computer-readable recording media.

Hereinafter, embodiments will be described with reference to the drawings.

It is to be noted that the embodiments described below each show a general or specific example. The numerical values, shapes, materials, constituent elements, the arrangement and connection of the constituent elements, steps, order of the steps, etc., indicated in the following embodiments are mere examples, and therefore are not intended to limit the scope of the claims. Therefore, among the constituent elements in the following embodiments, those not recited in any of the independent claims defining the most generic inventive concepts are described as optional constituent elements.

Embodiment 1

[Encoding Device Outline]

First, the encoding device according to Embodiment 1 will be outlined. FIG. 1 is a block diagram illustrating a functional configuration of encoding device 100 according to Embodiment 1. Encoding device 100 is a moving picture/picture encoding device that encodes a moving picture/picture block by block.

As illustrated in FIG. 1, encoding device 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoding device 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively encoding device 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoding device 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
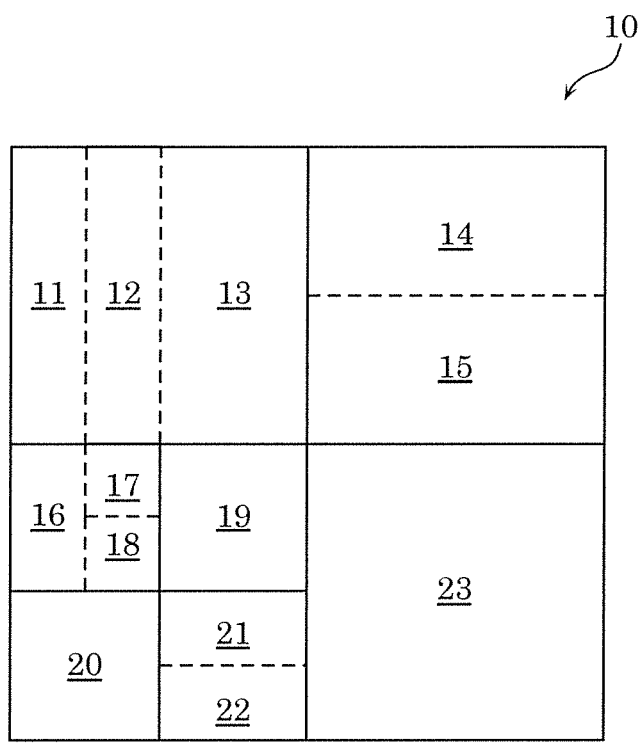
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoding device 100, and is a signal representing an image for each picture included in a moving picture (for example, a lama signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Added]

Adder 116 reconstructs the current block by summing prediction errors, which are inputs from inverse transformer 114, and prediction signals, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
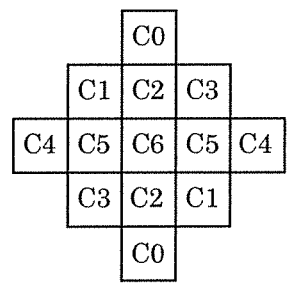
FIG. 4A illustrates one example of a filter shape used in ALF.
Figure 4B:
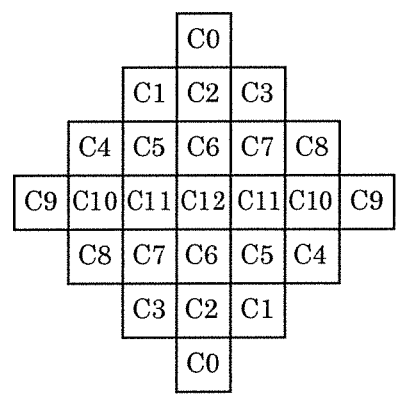
FIG. 4B illustrates another example of a filter shape used in ALF.
Figure 4C:
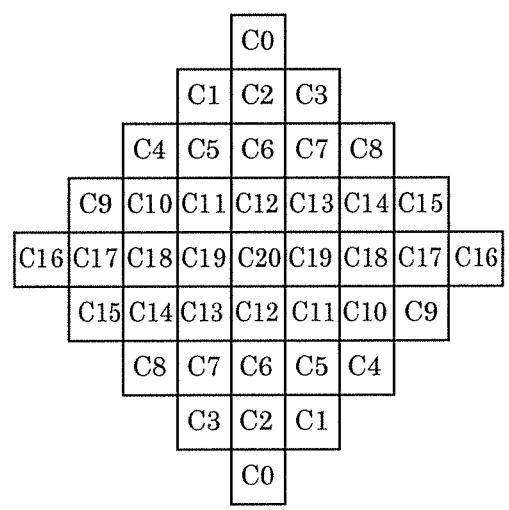
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see H.265 (ISO/IEC 23008-2 HEVC (High Efficiency Video Coding))).

Figure 5:
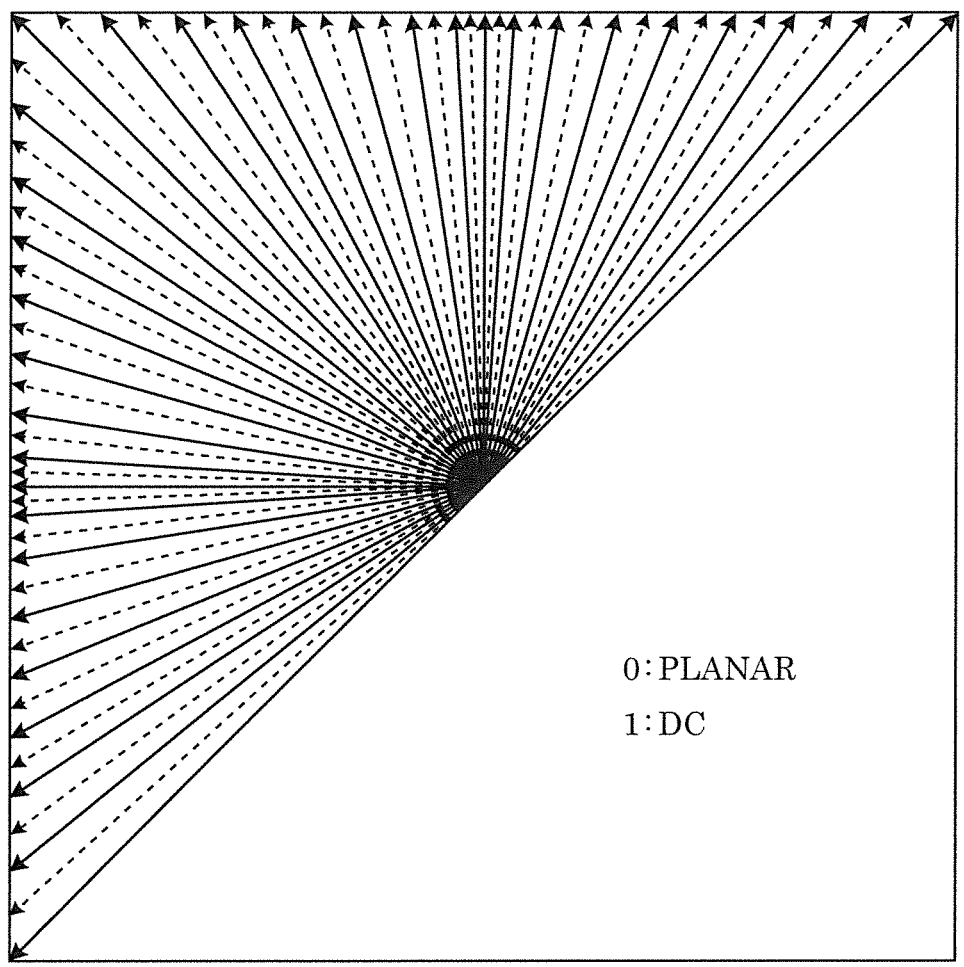
FIG. 5 illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5 illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Note that the motion information may be derived on the decoding device side without being signalled. For example, a merge mode defined in the H.265/HEVC standard may be used. Moreover, for example, the motion information may be derived by performing motion estimation on the decoding device side. In this case, motion estimation is performed without using the pixel values of the current block.

Here, a mode for performing motion estimation on the decoding device side will be described. A mode for performing motion estimation on the decoding device side is also referred to as pattern matched motion vector derivation (PMMVID) mode or frame rate up-conversion (FRUC) mode.

First, one candidate included in a merge list is selected as the starting point for the search by pattern matching. The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures.

Figure 6:
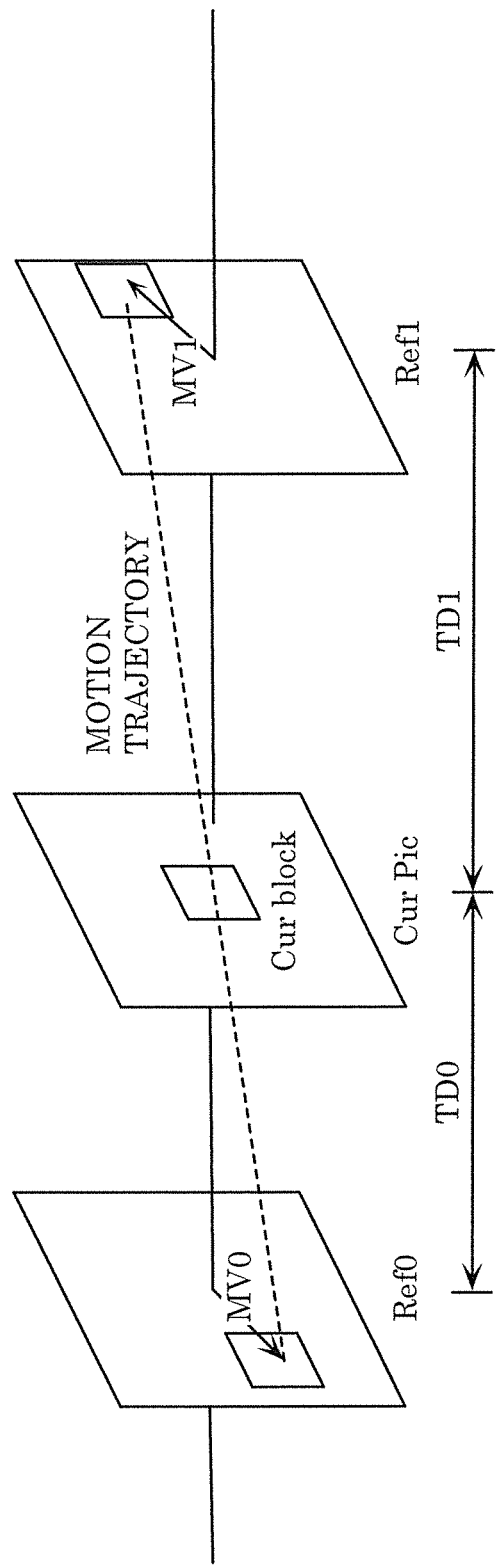
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1).

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture.

Figure 7:
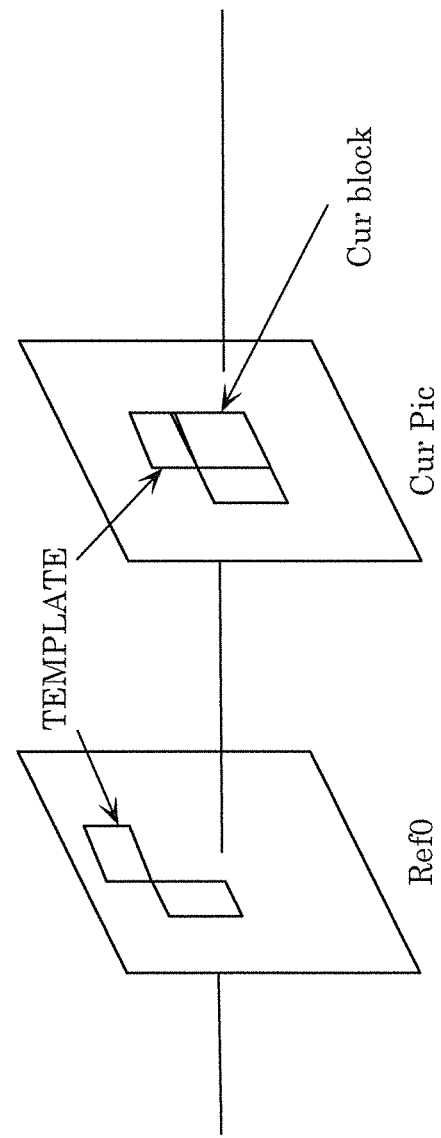
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic).

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

It is to be noted that motion information may be derived on the decoding device side using a method different from motion estimation. For example, the amount of correction for a motion vector may be calculated using the pixel value of a neighboring pixel in unit of a pixel, based on a model assuming uniform linear motion.

Here, a mode for deriving a motion vector based on a model assuming uniform linear motion will be described. This mode is also referred to as a bi-directional optical flow (BIO) mode.

Figure 8:
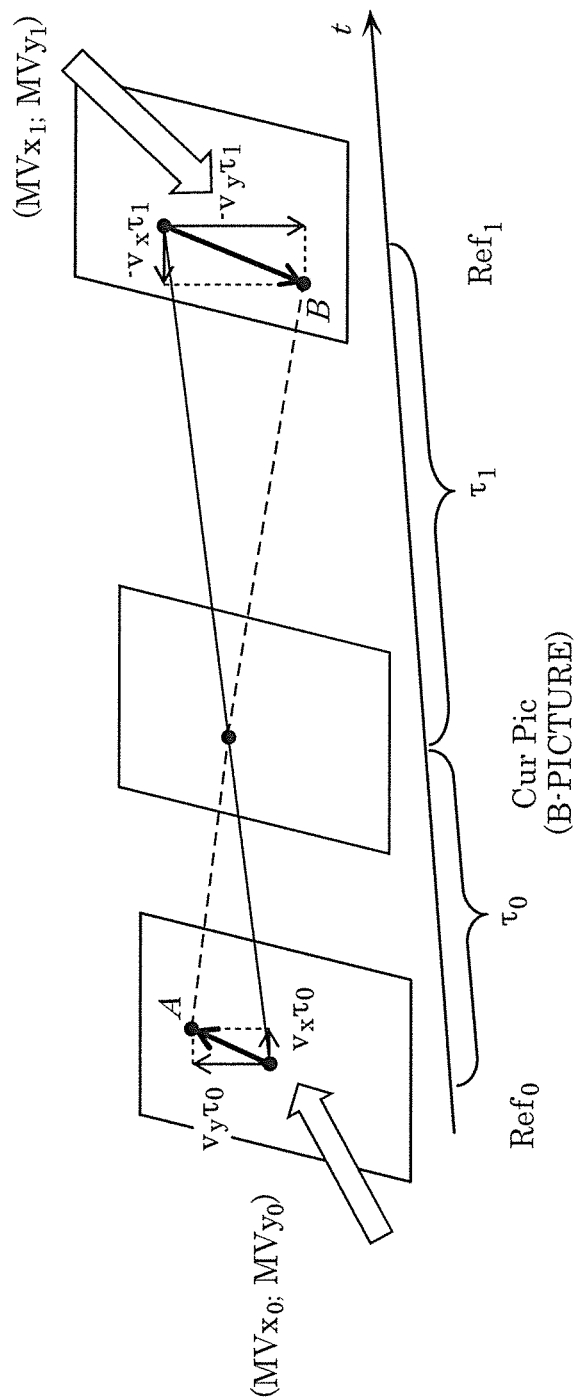
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ to and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$ respectively, and the following optical flow equation is given.

[MATH. 1]

$$\partial I^{(k)}/\partial t + v_x \partial I^{(k)}/\partial x + v_y \partial I^{(k)}/\partial y = 0 \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoding device side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9:
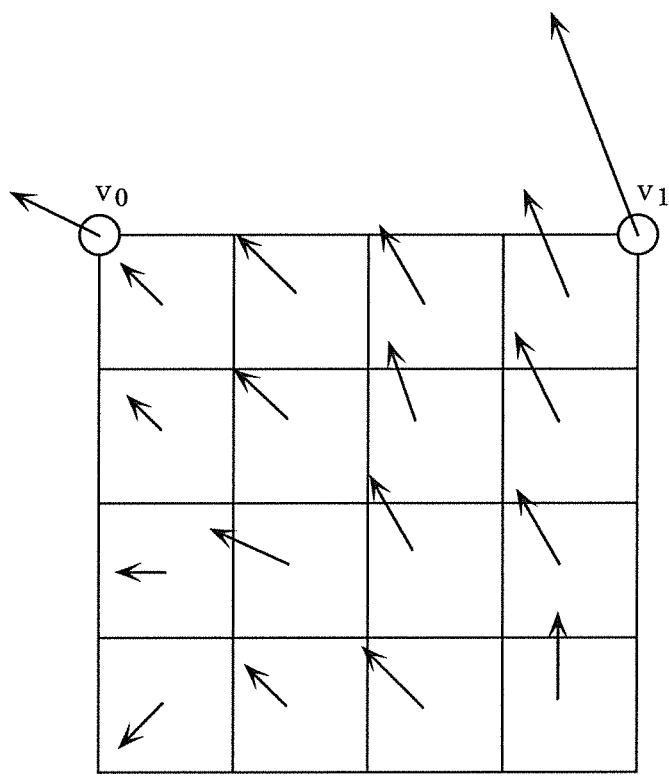
FIG. 9 is for illustrating deriving a motion vector of each sub-block based on motion vectors of neighboring blocks.

FIG. 9 is for illustrating deriving a motion vector of each sub-block based on motion vectors of neighboring blocks. In FIG. 9, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using two motion vectors $v_0$ and $v_1$, the motion vector $(v_x, v_y)$ of each sub-block in the current block is derived using Equation 2 below,

[MATH. 2]

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

[Decoding Device Outline]

Figure 10:
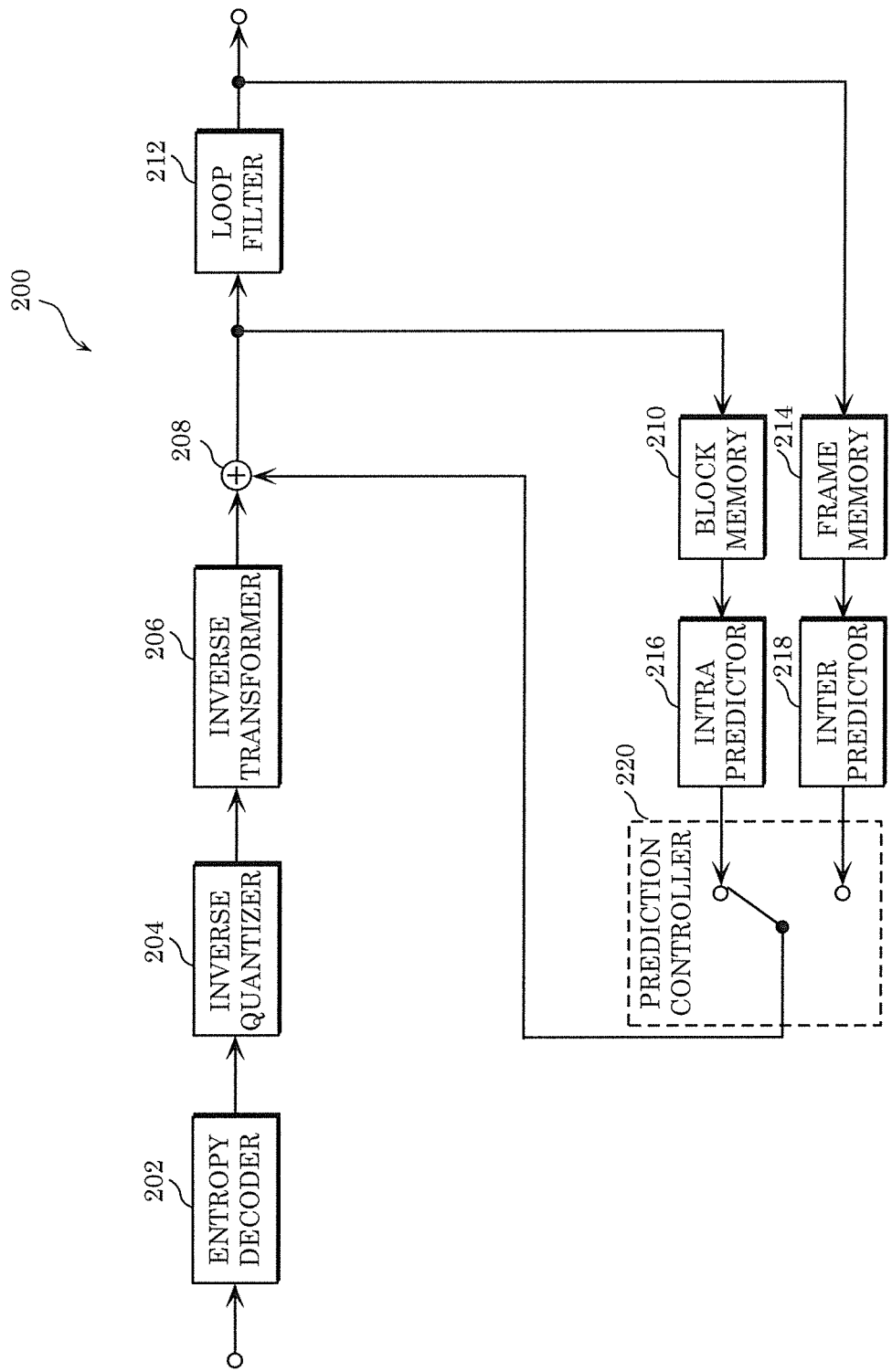
FIG. 10 is a block diagram illustrating a functional configuration of the decoding device according to Embodiment 1.

Next, a decoding device capable of decoding an encoded signal (encoded bitstream) output from encoding device 100 will be described. FIG. 10 is a block diagram illustrating a functional configuration of decoding device 200 according to Embodiment 1. Decoding device 200 is a moving picture/picture decoding device that decodes a moving picture/picture block by block.

As illustrated in FIG. 10, decoding device 200 includes entropy decoder 202, inverse quantizer 204, inverse transformer 206, adder 208, block memory 210, loop filter 212, frame memory 214, intra predictor 216, inter predictor 218, and prediction controller 220.

Decoding device 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively decoding device 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoding device 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients (transform results).

[Adder]

Adder 208 reconstructs the current block by summing prediction errors, which are inputs from inverse transformer 206, and prediction signals, which are inputs from prediction controller 220. Adder 208 then outputs the reconstructed block to block memory 210 and loop filter 212.

[Block. Memory]

Block memory 210 is storage for storing blocks in a picture to be decoded (hereinafter referred to as a current picture) for reference in intra prediction. More specifically block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 126 generates an inter prediction signal of the current block or sub-block by motion compensation by using motion information (for example, a motion vector) parsed from an encoded bitstream, and outputs the inter prediction signal to prediction controller 128.

Note that when the information parsed from the encoded bitstream indicates application of OBMC mode, inter predictor 126 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[A Specific Configuration of an Entropy Encoder in an Encoder]

Figure 11:
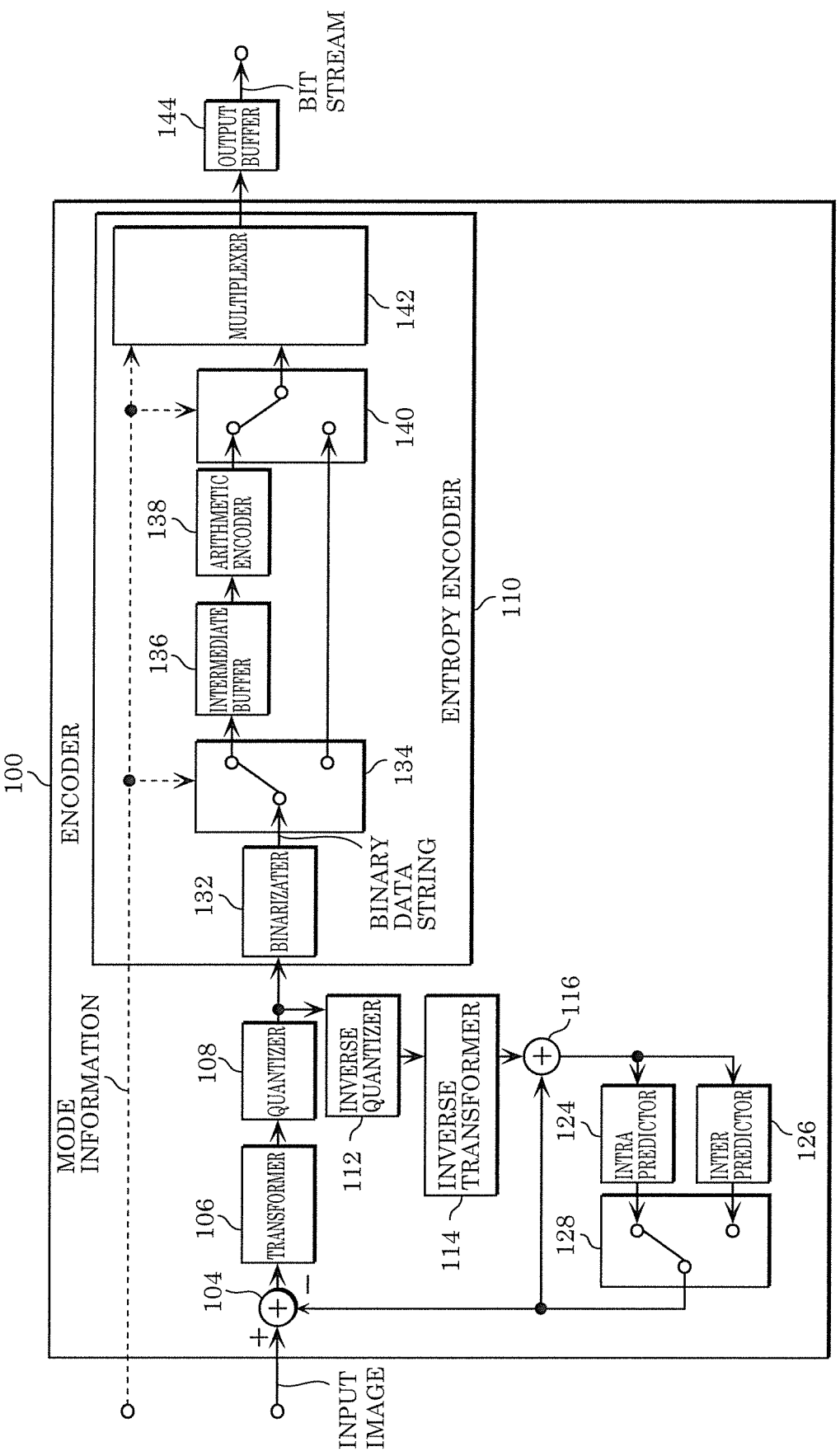
FIG. 11 is a block diagram illustrating a specific functional configuration of an entropy encoder in an encoder according to Embodiment 1.

FIG. 11 is a block diagram illustrating a specific functional configuration of entropy encoder 110 in encoder 100 according to Embodiment 1. Entropy encoder 110 variable-length encodes quantized coefficients output from quantizer 108 to generate a bit stream, and outputs the generated bit stream. The bit stream corresponds to encoded image information, and is also referred to as an encoded signal, an encoded bitstream, or an encoded bit stream.

In the example of FIG. 11, entropy encoder 110 includes: binarizer 132; switch 134; intermediate buffer 136; arithmetic encoder 138; switch 140; and multiplexer 142. Entropy encoder 110 generates a bit stream and outputs the generated bit stream to store the generated bit stream in output buffer 144. The bit stream stored in output buffer 144 is arbitrarily output from output buffer 144. Entropy encoder 110 may include output buffer 144.

[The Binarizer in the Entropy Encoder]

Binarizer 132 binarizes quantized coefficients, etc. More specifically binarizer 132 converts quantized frequency transform coefficients, etc. into a data string in which each of the values is represented by 0 or 1, and outputs the resulting data string. Hereinafter, the data string is also referred to as a binary data string. In addition, the binarization performed by binarizer 132 is binarization for arithmetic encoding, and particularly for binary arithmetic encoding. In other words, binarizer 132 derives the binary data string of the image information according to the binarization for arithmetic encoding.

It is to be noted that examples of binarization methods include: unary binarization; truncated unary binarization; unary and kth order exponential Golomb combined binarization; fixed length binarization, table reference, etc.

In addition, for example, entropy encoding according to a context-based adaptive binary arithmetic coding method is performed as the binarization by binarizer 132 and the arithmetic encoding by arithmetic encoder 138. The context-based adaptive binary arithmetic coding method is also referred to as CABAC. The binarization performed by binarizer 132 can be represented as binarization for context-based adaptive binary arithmetic coding method.

[The Switch in the Entropy Encoder]

Switches 134 and 140 operate together according to mode information, and switch whether or not to arithmetic encode the binary data string. For example, switches 134 and 140 switch whether or not to arithmetic encode the binary data string according to mode information which is given from outside encoder 100. The mode information may be given as an instruction from a user, a host system, or the like.

For example, the mode information selectively indicates a first mode and a second mode. In other words, the mode information indicates a selected one of the first mode and the second mode. For example, a binary data string has been arithmetic encoded in the first mode, and a binary data string has not been arithmetic encoded in the second mode.

More specifically, when the mode information indicates the first mode, switch 134 outputs the binary data string output from binarizer 132 to intermediate buffer 136 so as to store the binary data string in intermediate buffer 136. Arithmetic encoder 138 arithmetic encodes the binary data string stored in intermediate buffer 136, and outputs the binary data string which has been arithmetic encoded. Switch 140 outputs the binary data string output from arithmetic encoder 138 to multiplexer 142.

When the mode information indicates the second mode, switch 134 outputs the binary data string output from binarizer 132 to switch 140 as it is. Switch 140 outputs the binary data string output from switch 134 to multiplexer 142. In other words, arithmetic encoding is bypassed. It is to be noted that bypassing arithmetic encoding may be represented as skipping arithmetic encoding in order to avoid confusion with bypass arithmetic encoding which is an aspect of arithmetic encoding.

Mode information and a mode may be also represented as delay mode information and a delay mode, respectively. More specifically, the first mode is a normal mode, and the second mode is a low delay mode. Processing delay is reduced in the second mode than in the first mode.

[The Intermediate Buffer in the Entropy Encoder]

Intermediate buffer 136 is storage for storing binary data strings, and is also referred to as intermediate memory. Delay occurs in the arithmetic encoding performed by arithmetic encoder 138. In addition, the delay amount varies depending on the content of a binary data string. Intermediate buffer 136 absorbs variation in delay amount, which facilitates the subsequent processing. It is to be noted that inputting data in the storage such as intermediate buffer 136, or the like corresponds to storing data in the storage, and outputting the data from the storage corresponds to reading the data from the storage.

[The Arithmetic Encoder in the Entropy Encoder]

Arithmetic encoder 138 performs arithmetic encoding. More specifically arithmetic encoder 138 reads the binary data string stored in intermediate buffer 136, and arithmetic encodes the binary data string. Arithmetic encoder 138 may arithmetic encodes the binary data string according to the context-based adaptive binary coding method.

For example, arithmetic encoder 138 selects an occurrence probability according to context of a data type, or the like, performs arithmetic encoding according to the selected occurrence probability and updates the occurrence probability according to the result of the arithmetic encoding. In other words, arithmetic encoder 138 may perform arithmetic encoding according to the variable occurrence probability. The arithmetic encoding performed according to the variable occurrence probability may be also referred to as context-based adaptive arithmetic coding.

In addition, arithmetic encoder 138 may arithmetic encode data having a particular data type, or the like according to a fixed occurrence probability. More specifically, arithmetic encoder 138 may perform arithmetic encoding according to an occurrence probability of 50% as an occurrence probability of 0 or 1. The arithmetic encoding performed according to the fixed occurrence probability may be also referred to as bypass arithmetic encoding.

[The Multiplexer in the Entropy Encoder]

Multiplexer 142 multiplexes mode information and a binary data string to generate a bit stream including the mode information and the binary data string. Multiplexer 142 outputs the bit stream to output buffer 144 so as to store the bit stream in output buffer 144. The bit stream stored in output buffer 144 is arbitrarily output from output buffer 144. In other words, multiplexer 142 outputs the bit stream via output buffer 144.

For example, the mode information may be included in the bit stream as a higher-order parameter. More specifically the mode information may be included in a sequence parameter set (SPS) in a bit stream, in a picture parameter set (PPS) in the bit stream, or in a slice header in the bit stream. The mode information included in the bit stream is represented as one or more bits.

The binary data string may be included in the slice data. Here, the binary data string may be a binary data string which has been arithmetic encoded, or may be a binary data string which has not been arithmetic encoded.

In addition, the mode information included in the bit stream may be represented also as application information indicating whether or not the binary data string included in the bit stream has been arithmetic encoded. In other words, the mode information may be included in the bit stream as application information indicating whether or not the binary data string included in the bit stream has been arithmetic encoded. The application information may indicate whether the bit stream includes the binary data string which has been arithmetic encoded or the binary data string which has not been arithmetic encoded.

It is to be noted that the mode information may not be included in the bit stream, for example, when the mode information is exchanged in the host system and when the mode information is predefined. In other words, in this case, multiplexing does not need to be performed.

[The Output Buffer]

Output buffer 144 is storage for storing bit streams, and is also referred to as a coded picture buffer (CPB) or output memory. A bit stream which is obtained by means of encoder 100 encoding image information is stored in output buffer 144. The bit stream stored in output buffer 144 is arbitrarily output, and is multiplexed with, for example, an encoded audio signal, etc.

[A Specific Configuration of an Entropy Decoder in a Decoder]

Figure 12:
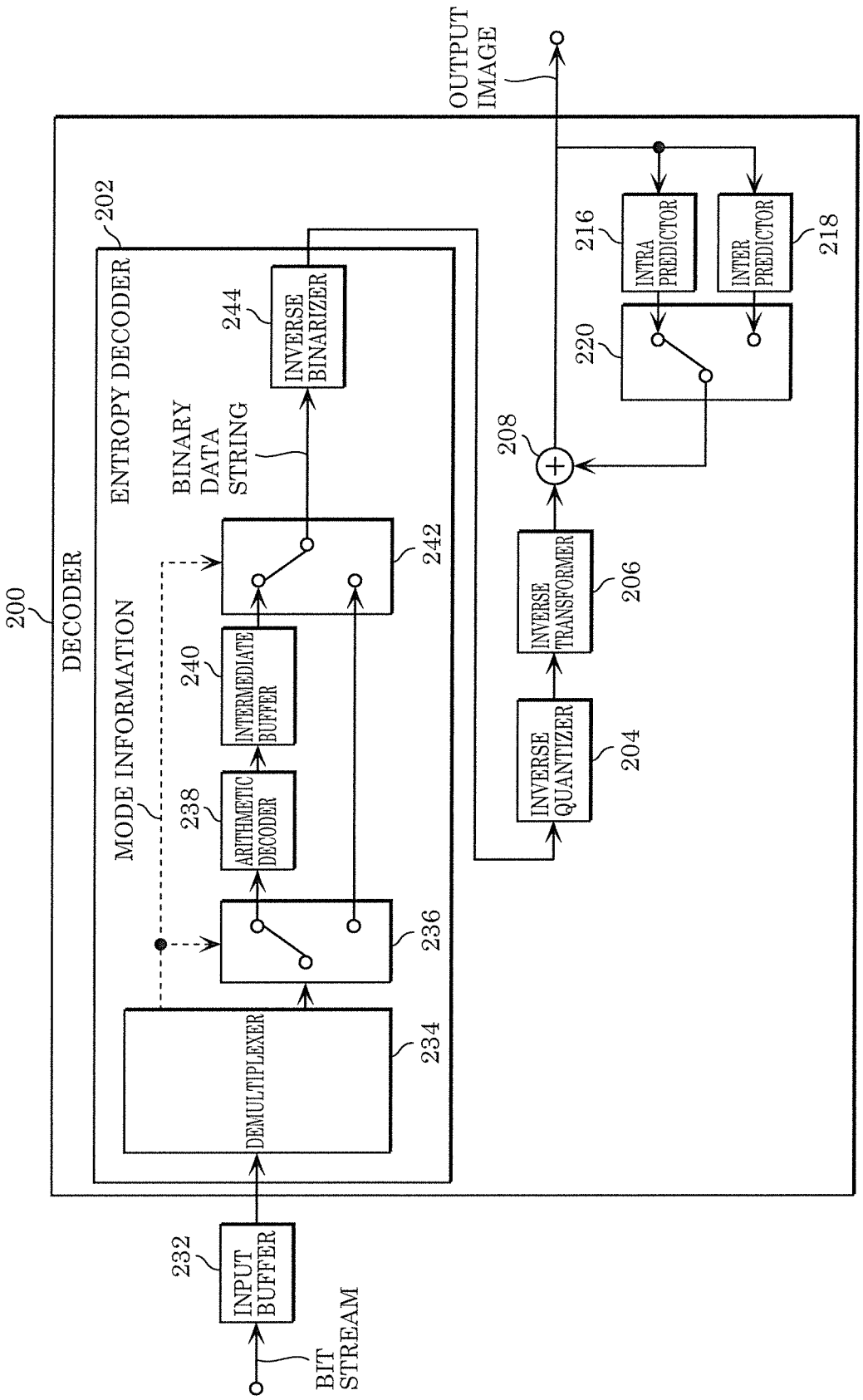
FIG. 12 is a block diagram illustrating a specific functional configuration of an entropy decoder in a decoder according to Embodiment 1.

FIG. 12 is a block diagram illustrating a specific functional configuration of entropy decoder 202 in decoder 200 according to Embodiment 1. Entropy decoder 202 derives quantized coefficients, etc. by entropy decoding a bit stream input via input buffer 232. The bit stream is a bit stream generated by encoder 100 and has, for example, the above-described data structure.

In the example of FIG. 12, entropy decoder 202 includes: demultiplexer 234; switch 236; arithmetic decoder 238; intermediate buffer 240; switch 242; and inverse binarizer 244. Entropy decoder 202 may include input buffer 232.

[The Input Buffer]

Input buffer 232 is storage for storing bit streams and is also referred to as a CPB or input memory. A bit stream decoded by decoder 200 is, for example, demultiplexed from an encoded audio signal, etc. and is stored in input buffer 232. Decoder 200 reads the bit stream stored in input buffer 232, and decodes the bit stream.

[The Demultiplexer in the Entropy Decoder]

Demultiplexer 234 obtains a bit stream from input buffer 232, demultiplexes mode information and the binary data string from the bit stream, and outputs the mode information and the binary data string. In other words, demultiplexer 234 obtains the bit stream including the mode information and the binary data string via input buffer 232, and outputs the mode information and the binary data string included in the bit stream. The binary data string may be a binary data string which has been arithmetic encoded, or may be a binary data string which has not been arithmetic encoded.

As described above, the mode information may be represented also as application information indicating whether or not the binary data string included in the bit stream has been arithmetic encoded. It is to be noted that the mode information may not be included in the bit stream, for example, when the mode information is exchanged in the host system and when the mode information is predefined. In this case, the mode information does not need to be demultiplexed and output. The mode information may be given as an instruction from outside decoder 200, specifically, from a user, the host system, or the like.

[The Switch in the Entropy Decoder]

Switches 236 and 242 operate together according to mode information which is obtained from demultiplexer 234, or the like, and switches whether or not to arithmetic decode the binary data string. For example, the binary data string is arithmetic decoded in the first mode out of the first mode and the second mode selectively indicated by the mode information, and the binary data string is not arithmetic decoded in the second mode.

More specifically when the mode information indicates the first mode, switch 236 outputs the binary data string which is output from demultiplexer 234 to arithmetic decoder 238. Arithmetic decoder 238 arithmetic decodes the binary data string, and outputs the binary data string which has been arithmetic decoded to store the binary data string which has been arithmetic decoded in intermediate buffer 240. Switch 242 arbitrarily obtains the binary data string stored in intermediate buffer 240, and outputs the binary data string obtained from intermediate buffer 240 to inverse binarizer 244.

When the mode information indicates the second mode, switch 236 outputs the binary data string which is output from demultiplexer 234 to switch 242 as it is. Switch 242 outputs the binary data string output from switch 236 to inverse multiplexer 244. In other words, arithmetic decoding is bypassed. It is to be noted that bypassing arithmetic decoding may be represented as skipping arithmetic decoding in order to avoid confusion with bypass arithmetic decoding which is an aspect of arithmetic decoding.

[The Arithmetic Decoder in the Entropy Decoder]

Arithmetic decoder 238 performs arithmetic decoding. Specifically, arithmetic decoder 238 arithmetic decodes binary data string which has been arithmetic encoded, and outputs the binary data string which has been arithmetic decoded to store the binary data string which has been arithmetic decoded in intermediate buffer 240. The arithmetic decoded binary data string corresponds to the original binary data string which has not been arithmetic encoded. Arithmetic encoder 138 may arithmetic decode the binary data string according to the context-based adaptive binary coding method.

For example, arithmetic decoder 238 selects an occurrence probability according to context of a data type, or the like, performs arithmetic decoding according to the selected occurrence probability and updates the occurrence probability according to the result of the arithmetic decoding. In other words, arithmetic decoder 238 may perform arithmetic decoding according to the variable occurrence probability. The arithmetic decoding performed according to the variable occurrence probability may be also referred to as context-based adaptive arithmetic decoding.

In addition, arithmetic decoder 238 may arithmetic decode data having a particular data type, or the like according to a fixed occurrence probability. Specifically arithmetic decoder 238 may perform arithmetic decoding according to an occurrence probability of 50% as an occurrence probability of 0 or 1. The arithmetic decoding performed according to a fixed occurrence probability is also referred to as bypass arithmetic decoding.

[The Intermediate Buffer in the Entropy Decoder]

Intermediate buffer 240 is storage for storing binary data strings which have been arithmetic decoded, and is also referred to as intermediate memory. Delay occurs in the arithmetic decoding performed by arithmetic decoder 238. In addition, the delay amount varies depending on the content of a binary data string. Intermediate buffer 240 absorbs variation in delay amount, which facilitates the subsequent processing.

[The Inverse Binarizer in the Entropy Decoder]

Inverse binarizer 244 derives quantized coefficients, etc. by inverse binarizing a binary data string. Specifically inverse binarizer 244 converts the binary data string in which each of values is represented as 0 or 1 into quantized frequency coefficients, etc., and outputs the quantized frequency coefficients, etc. to inverse quantizer 204. In addition, inverse binarization performed by inverse binarizer 244 is inverse binarization corresponding to binarization for arithmetic encoding, and specifically inverse binarization corresponding to binarization for binary arithmetic encoding.

In addition, for example, entropy decoding according to a context-based adaptive binary arithmetic coding method is performed as the arithmetic decoding by arithmetic decoder 238 and the inverse binarization by inverse binarizer 244. In other words, inverse binarizer 244 may perform inverse binarization corresponding to the context-based binary arithmetic coding method. In addition, the inverse binarization is also referred to as multi-value processing.

[A Codec System]

Figure 13:
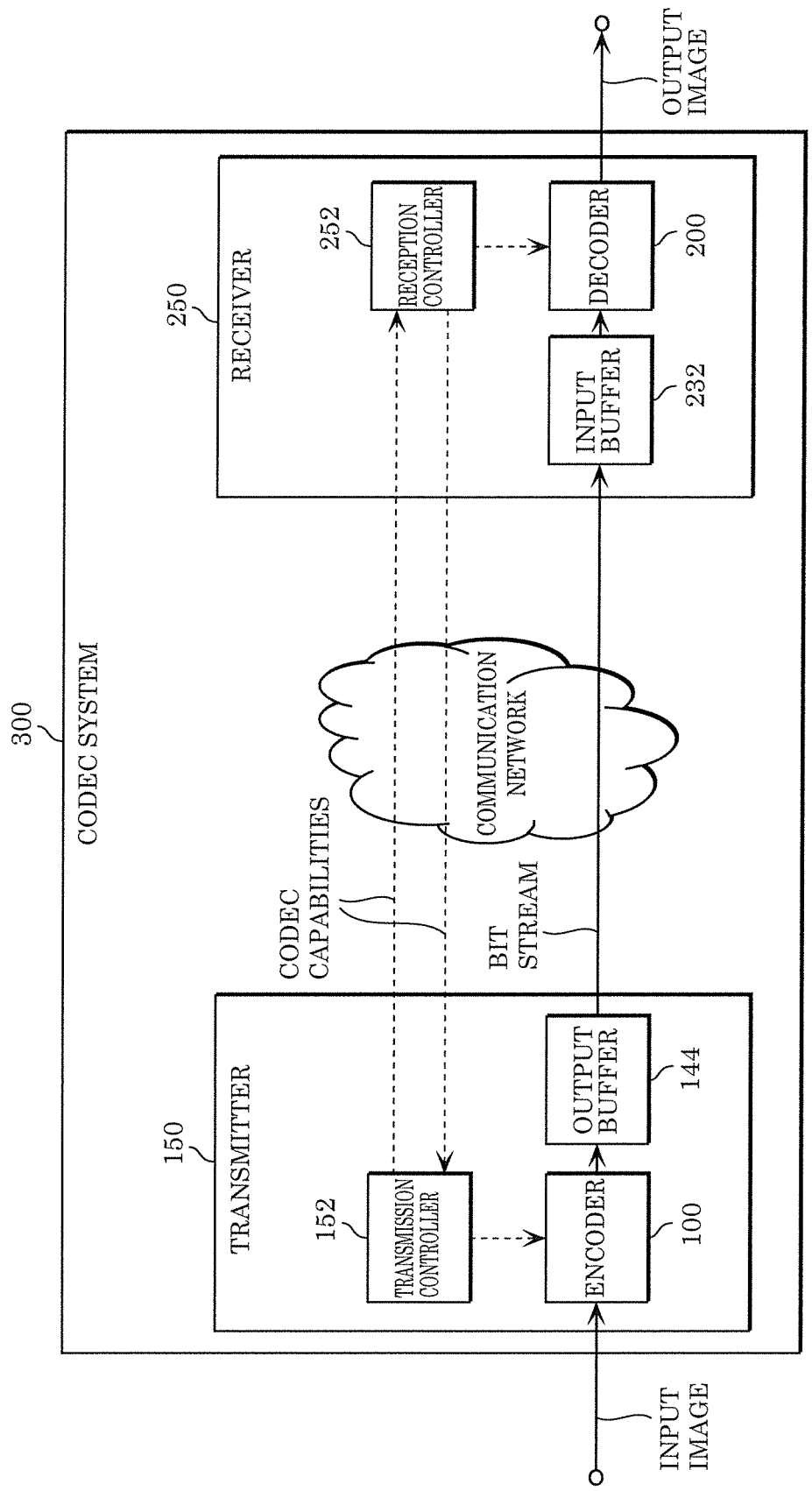
FIG. 13 is a block diagram illustrating a functional configuration of a codec system including the encoder and the decoder according to Embodiment 1.

FIG. 13 is a block diagram illustrating a functional configuration of codec system 300 including encoder 100 and decoder 200 according to Embodiment 1. Codec system 300 includes transmitter 150 and receiver 250, and encodes, transmits, receives, and decodes image information. Transmitter 150 includes transmission controller 152, encoder 100, and output buffer 144, and encodes and transmits image information. Receiver 250 includes reception controller 252, input buffer 232, and decoder 200, and receives and decodes the encoded image information.

For example, before communication of the image information, that is, transmission and reception of the image information is started, information regarding codec capabilities is exchanged between transmitter 150 and receiver 250. The codec capabilities mean capabilities related to encoding and decoding of the image information. In this way, the encoding method including the above-described first mode and the second mode is determined.

In the example of FIG. 13, before the transmission and reception of the image information is started, transmission controller 152 and reception controller 252 exchange the information regarding codec capabilities of encoder 100 and decoder 200. Transmission controller 152 and reception controller 252 determine the encoding method including the first mode and the second mode.

For example, according to the mode supported by both encoder 100 and decoder 200, either the first mode in which arithmetic encoding is performed or the second mode in which arithmetic encoding is not performed may be determined as the mode to be used for encoding and decoding. When both the first mode and the second mode are supported, either the first mode or the second mode may be determined as the mode to be used for encoding and decoding according to a predetermined priority order.

For example, in the first mode, increase in coding amount and decrease in image quality are reduced while processing delay occurs. In the second mode, processing delay is reduced while coding amount increases and image quality decreases. Accordingly, in an environment in which either increase in coding amount or decrease in image quality is preferentially reduced, the first mode may be predetermined as the mode prioritized over the second mode. In addition, in an environment in which processing delay is preferentially reduced, the second mode may be determined as the mode prioritized over the first mode.

Transmission controller 152 notifies encoder 100 of the determined encoding method, and reception controller 252 notifies decoder 200 of the determined encoding method. Encoder 100 encodes the image information according to the notified encoding method, and decoder 200 decodes the image information according to the decoding method corresponding to the notified encoding method.

For example, transmission controller 152 notifies encoder 100 of mode information indicating the mode determined out of the first mode and the second mode, as an instruction. Reception controller 252 notifies decoder 200 of the mode information indicating the mode determined out of the first mode and the second mode, as the instruction.

Encoder 100 outputs the bit stream including one of the binary data string which has been arithmetic encoded and the binary data string which has not been arithmetic encoded, according to the mode information notified as the instruction. Decoder 200 derives the image information from the one of the binary data string which has been arithmetic encoded and the binary data string which has not been arithmetic encoded, according to the mode information notified as the instruction. The one of the binary data strings has been included in the slice data of the bit stream.

It is to be noted that codec capabilities do not always need to be exchanged when the encoding method including the first mode, the second mode, or the like is fixedly used in codec system 300. Transmission controller 152 and reception controller 252 may fixedly notify encoder 100 and decoder 200 of the encoding method including the first mode, the second mode, or the like. Alternatively, encoder 100 and decoder 200 may fixedly store the encoding method including the first mode, the second mode, or the like as an internal parameter.

In addition, in a predetermined profile among a plurality of profiles determined in encoding standards, the mode to be used for encoding and decoding may be always fixed to one of the first mode and the second mode.

In addition, the mode information may be included in an SPS, a PPS, a slice header, or the like in a bit stream as a higher-order parameter. In this way, decoder 200 can switch whether or not to apply arithmetic decoding to a binary data string included in the bit stream according to the mode information included in the bit stream.

In addition, low_delay_hrd_flag indicating a low-delay HEM mode defined in H.265 may be used as the mode information. Alternatively, the mode information may be information other than low_delay_hrd_flag, or the like. In this case, application of arithmetic encoding and the HRD mode are separately switched, and thus it is possible to adapt delay amount to an application or the like in a higher layer more flexibly.

[A Mounting Example of the Encoder]

Figure 14:
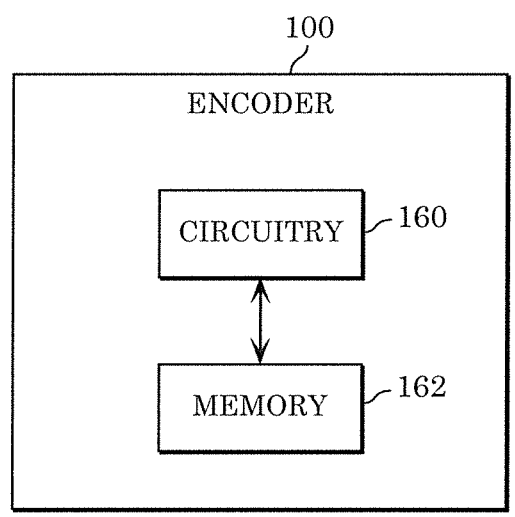
FIG. 14 is a block diagram illustrating a mounting example of the encoder according to Embodiment 1.

FIG. 14 is a block diagram illustrating a mounting example of encoder 100 according to Embodiment 1. Encoder 100 includes circuitry 160 and memory 162. For example, a plurality of constituent elements of encoder 100 illustrated in FIGS. 1 and 11 are mounted as circuitry 160 and memory 162 illustrated in FIG. 14.

Circuitry 160 is a circuit for performing information processing and is accessible to memory 162. For example, circuitry 160 is an exclusive or general electronic circuit for encoding image information. Circuitry 160 may be a processor such as a CPU. Alternatively circuitry 160 may be an assembly of a plurality of electronic circuits. In addition, for example, circuitry 160 may take the roles of two or more of the constituent elements other than the constituent elements for storing information among the plurality of constituent elements of encoder WO illustrated in FIGS. 1 and 11.

Memory 162 is a general or exclusive memory in which information used by circuitry 160 to encode image information is stored. Memory 162 may be an electronic circuit, or may be connected to circuitry 160. Alternatively, memory 162 may be an assembly of a plurality of electronic circuits. In addition, memory 162 may be a magnetic disc, an optical disc, or the like, or may be represented as storage, a recording medium, or the like. In addition, memory 162 may be non-volatile memory, or volatile memory.

For example, image information to be encoded or a bit stream corresponding to encoded image information may be stored in memory 162. In addition, a program that is executed by circuitry 160 to encode image information may be stored in memory 162.

In addition, for example, circuitry 160 may take the roles of the constituent elements for storing information among the plurality of constituent elements of encoder 100 illustrated in FIGS. 1 and 11. Specifically, memory 162 may take the roles of block memory 118 and frame memory 122 illustrated in FIG. 1, or the role of intermediate buffer 136 illustrated in FIG. 11.

It is to be noted that, in encoder 100, not all the plurality of constituent elements illustrated in FIGS. 1, 11, etc. may be mounted, or not all the plurality of processes described above may be performed. Part of the plurality of constituent elements illustrated in FIGS. 1, 11, etc. may be included in one or more other devices, and part of the plurality of processes described above may be performed by the one or more other devices.

In addition, reduction in processing delay generated by arithmetic encoding may be supported by means of part of the plurality of constituent elements illustrated in FIGS. 1, 11, or the like being mounted in encoder 100 and the part of the plurality of processes described above being performed.

[An Example of a First Encoding Operation Performed by the Encoder]

Figure 15:
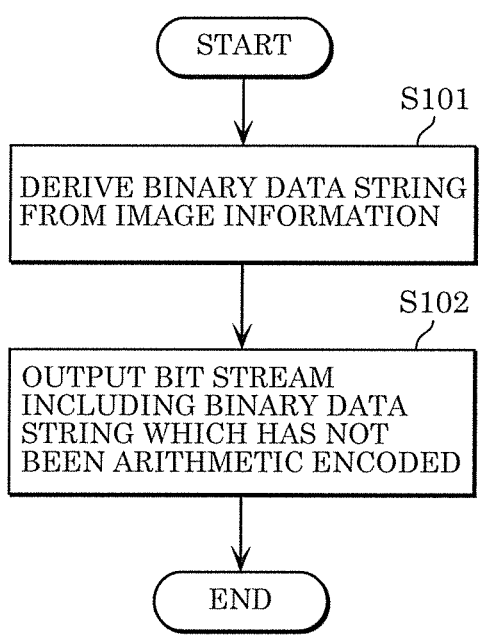
FIG. 15 is a flowchart indicating a first example of an encoding operation performed by the encoder according to Embodiment 1.

FIG. 15 is a flowchart indicating a first example of an encoding operation performed by encoder 100 according to Embodiment 1. For example, image information is encoded when the operation illustrated in FIG. 15 is performed by circuitry 160 of encoder 100 illustrated in FIG. 14.

As illustrated in FIG. 15, circuitry 160 firstly derives, from the image information, a binary data string according to binarization for arithmetic encoding (S101). It is to be noted that the image information is information indicating an image. Specifically the image information may be information indicating quantized coefficients which are obtained from the image by performing the above-described transform, quantization, prediction, etc. Alternatively the image information may be information indicating pixel values which are obtained from the image without performing the above-described transform, quantization, prediction, etc.

Circuitry 160 outputs a bit stream including a binary data string which has not been arithmetic encoded (S102).

Specifically, circuitry 160 outputs a bit stream which includes the binary data string and application information indicating whether or not the binary data string has been arithmetic encoded. At this time, circuitry 160 outputs a bit stream which includes the binary data string which has not been arithmetic encoded and application information indicating that the binary data string has not been arithmetic encoded.

In this way, encoder 100 can skip arithmetic encoding. Accordingly encoder 100 can support reduction in processing delay generated by the arithmetic encoding. In addition, encoder 100 can effectively utilize binarization resources for arithmetic encoding. In addition, encoder 100 can output the bit stream including the application information for distinguishing the application state of arithmetic encoding.

It is to be noted that operations which are performed by encoder 100 include and are not always limited to the above-described operations such as the transform, quantization, prediction, etc. For example, encoder 100 does not need to perform the other operations. Even when the operations performed by encoder 100 are not limited to the above-described operations, encoder 100 is capable of supporting reduction in processing delay generated by arithmetic encoding.

Alternatively for example, circuitry 160 may switch a first operation and a second operation. In the first operation, circuitry 160 outputs a bit stream which includes: a binary data string which has been arithmetic encoded; and, as application information, information indicating that the binary data string has been arithmetic encoded. In the second operation, circuitry 160 outputs a bit stream which includes:

a binary data string which has not been arithmetic encoded; and, as application information, information indicating that the binary data string has not been arithmetic encoded.

In this way encoder 100 is capable of adaptively skipping arithmetic encoding, and adaptively switching whether or not to perform arithmetic encoding. In addition, circuitry 160 is capable of performing the first operation and the second operation at different timings by switching the first operation and the second operation. It is to be noted that the first operation and the second operation performed by circuitry 160 may be represented as a first output operation and a second output operation.

In addition, for example, circuitry 160 may switch the first operation and the second operation in units of at least one entire picture. In this way, encoder 100 is capable of reducing increase in processing amount required for switching between the application states of arithmetic encoding.

In addition, for example, circuitry 160 may switch between the first operation and the second operation according to information given from outside encoder 100, or according to information stored in encoder 100. In this way circuitry 160 is capable of appropriately switching between the first operation and the second operation according to the information outside or inside encoder 100.

In addition, for example, circuitry 160 may output a bit stream which includes application information indicating, in units of at least one entire picture, whether or not the binary data string has been arithmetic encoded. In other words, the application information may indicate, in units of at least one entire picture, whether the bit stream includes the binary data string which has been arithmetic encoded or the binary data string which has not been arithmetic encoded. In this way, encoder 100 is capable of reducing increase in coding amount and processing amount required for the application information.

[An Example of a Second Encoding Operation Performed by the Encoder]

Figure 16:
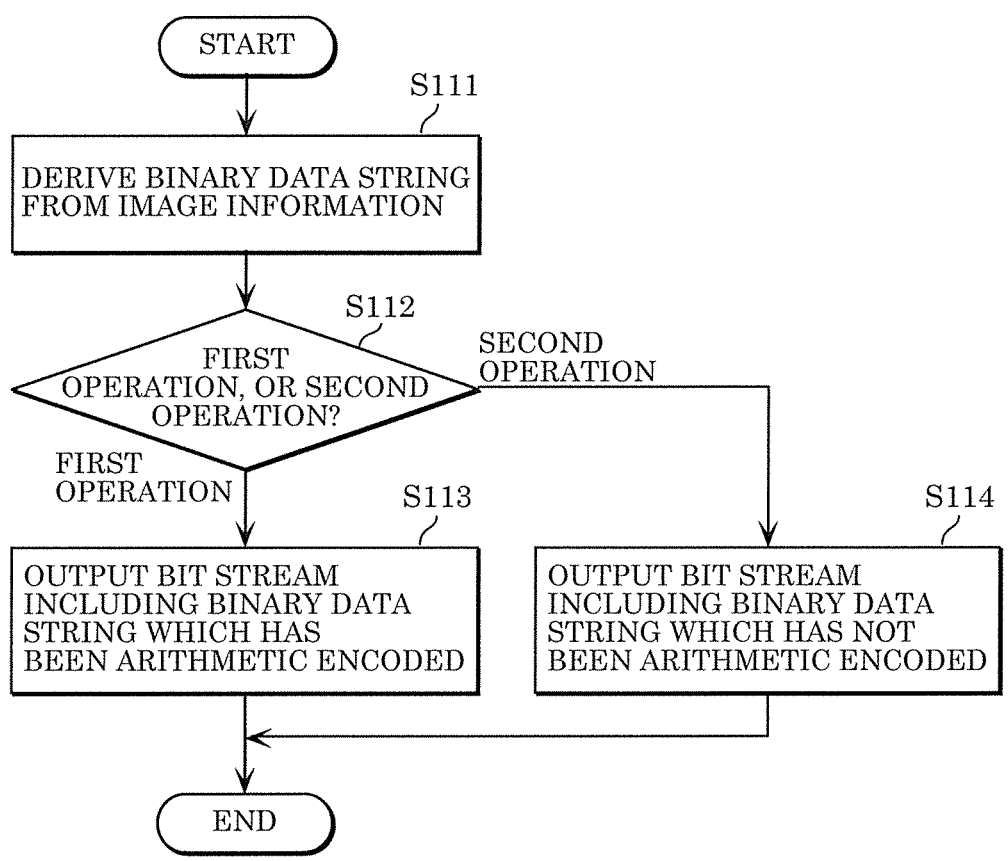
FIG. 16 is a flowchart indicating a second example of an encoding operation performed by the encoder according to Embodiment 1.

FIG. 16 is a flowchart indicating a second example of an encoding operation performed by encoder 100 according to Embodiment 1. For example, image information is encoded when the operation illustrated in FIG. 16 is performed by circuitry 160 of encoder 100 illustrated in FIG. 14.

As illustrated in FIG. 16, circuitry 160 firstly derives, from the image information, a binary data string according to binarization for arithmetic encoding (S111). The operation is the same as a deriving process (S101) in FIG. 15.

Circuitry 160 switches between a first operation and a second operation (S112). In the first operation, circuitry 160 outputs a bit stream which includes a binary data string which has been arithmetic encoded (S113). In the second operation, circuitry 160 outputs a bit stream which includes a binary data string which has not been arithmetic encoded (S114).

In this way, encoder 100 is capable of adaptively switching whether or not to perform arithmetic encoding, and adaptively skipping arithmetic encoding. Accordingly, encoder 100 can support reduction in processing delay generated by the arithmetic encoding. In addition, encoder 100 can effectively utilize binarization resources for arithmetic encoding. In addition, circuitry 160 is capable of performing the first operation and the second operation at different timings by switching the first operation and the second operation.

It is to be noted that operations which are performed by encoder 100 are not always limited to the above-described operations such as the above-described transform, quantization, prediction, etc. For example, encoder 100 does not need to perform the other operations. Even when the operations performed by encoder 100 are not limited to the above-described operations, encoder 100 is capable of supporting reduction in processing delay generated by arithmetic encoding.

Specifically, circuitry 160 outputs a bit stream which includes a binary data string and application information indicating whether or not the binary data string has been arithmetic encoded.

In the first operation, circuitry 160 may output a bit stream which includes: a binary data string which has been arithmetic encoded; and, as application information, information indicating that the binary data string has been arithmetic encoded. In the second operation, circuitry 160 outputs a bit stream which includes: a binary data string which has not been arithmetic encoded; and, as application information, information indicating that the binary data string has not been arithmetic encoded.

In this way, encoder 100 can output the bit stream including the application information for distinguishing the application state of arithmetic encoding.

In addition, for example, circuitry 160 may switch between the first operation and the second operation according to information given from outside encoder 100, or according to information stored in encoder 100, as in the first example of the encoding operation.

In addition, for example, circuitry 160 may switch between the first operation and the second operation in units of at least one entire picture, as in the first example of the encoding operation. In addition, for example, circuitry 160 may output a bit stream which includes application information indicating, in units of at least one entire picture, whether or not the binary data string has been arithmetic encoded, as in the first example of the encoding operation.

[A Mounting Example of the Decoder]

Figure 17:
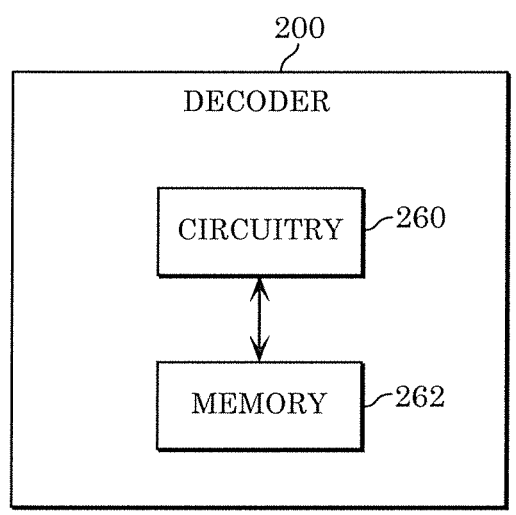
FIG. 17 is a block diagram illustrating a mounting example of the decoder according to Embodiment 1.

FIG. 17 is a block diagram illustrating a mounting example of decoder 200 according to Embodiment 1. Decoder 200 includes circuitry 260 and memory 262. For example, a plurality of constituent elements of decoder 200 illustrated in FIGS. 10 and 12 are mounted as circuitry 260 and memory 262 illustrated in FIG. 17.

Circuitry 260 is a circuit for performing information processing and accessible to memory 262. For example, circuitry 260 is an exclusive or general electronic circuit for decoding image information. Circuitry 260 may be a processor such as a CPU. Alternatively, circuitry 260 may be an assembly of a plurality of electronic circuits. In addition, for example, circuitry 260 may take the roles of two or more of the constituent elements other than the constituent elements for storing information among the plurality of constituent elements of decoder 200 illustrated in FIGS. 10 and 12.

Memory 262 is a general or exclusive memory for storing information for decoding image information. Memory 262 may be an electronic circuit, or may be connected to circuit 260. Alternatively, memory 262 may be an assembly of a plurality of electronic circuits. In addition, memory 262 may be a magnetic disc, an optical disc, or the like, or may be represented as storage, a recording medium, or the like. In addition, memory 262 may be non-volatile memory, or volatile memory.

For example, a bit stream corresponding to encoded image information or image information corresponding to a decoded bit stream may be stored in memory 262. In addition, a program that is executed by circuitry 260 to decode image information may be stored in memory 262.

In addition, for example, circuitry 260 may take the roles of two or more of the constituent elements other than the constituent elements for storing information among the plurality of constituent elements of decoder 200 illustrated in FIGS. 10 and 12. Specifically, memory 262 may take the roles of block memory 210 and frame memory 214 illustrated in FIG. 10, or the role of intermediate buffer 240 illustrated in FIG. 12.

It is to be noted that, in decoder 200, not all the plurality of constituent elements illustrated in FIGS. 10, 12, etc. may be mounted, or not all the plurality of processes described above may be performed. Part of the plurality of constituent elements illustrated in FIGS. 10, 12, etc. may be included in one or more other devices, and part of the plurality of processes described above may be performed by the one or more other devices.

In addition, reduction in processing delay generated by arithmetic decoding may be supported by means of part of the plurality of constituent elements illustrated in FIGS. 10, 12, or the like being mounted in decoder 200 and the part of the plurality of processes described above being performed.

[A First Example of a Decoding Operation Performed by the Decoder]

Figure 18:
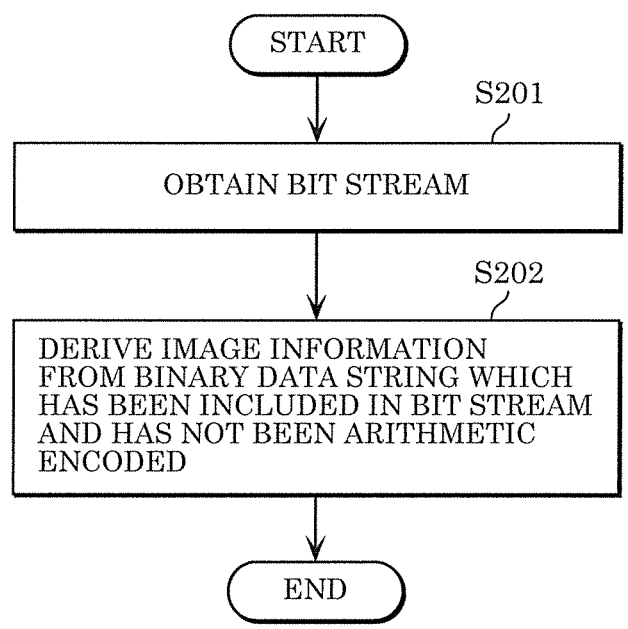
FIG. 18 is a flowchart indicating a first example of a decoding operation performed by the decoder according to Embodiment 1.

FIG. 18 is a flowchart indicating a first example of a decoding operation performed by decoder 200 according to Embodiment 1. For example, image information is decoded when the operation illustrated in FIG. 18 is performed by circuitry 260 of decoder 200 illustrated in FIG. 17.

As illustrated in FIG. 18, circuitry 260 obtains a bit stream including a binary data string derived from the image information according to binarization for arithmetic encoding (S201). Specifically circuitry 260 obtains a bit stream which includes the binary data string derived from the image information according to binarization for arithmetic encoding and includes application information indicating whether or not the binary data string has been arithmetic encoded.

Circuitry 260 obtains the image information from the binary data string which has not been arithmetic encoded (S202). Specifically, circuitry 260 derives the image information from the binary data string which has not been arithmetic encoded and which has been included in the bit stream including, as the application information, the information indicating that the binary data string has not been arithmetic encoded.

In this way, decoder 200 can skip arithmetic decoding. Accordingly, decoder 200 can support reduction in processing delay generated by the arithmetic decoding. In addition, decoder 200 can effectively utilize inverse binarization resources for arithmetic decoding. In this way decoder 200 is capable of obtaining the bit stream including the application information for distinguishing the application state of arithmetic encoding, and deriving the image information therefrom.

It is to be noted that operations which are performed by decoder 200 include and are not always limited to the above-described operations such as the transform, quantization, prediction, etc. For example, decoder 200 does not need to perform the other operations. Even when the operations performed by decoder 200 are not limited to the above-described operations, decoder 200 is capable of supporting reduction in processing delay generated by arithmetic decoding.

Alternatively for example, circuitry 260 may switch the first operation and the second operation. In the first operation, circuitry 260 derives image information from a binary data string which has been arithmetic encoded and which has been included in a bit stream including, as application information, information indicating that the binary data string has been arithmetic encoded. In the second operation, circuitry 260 derives image information from a binary data string which has not been arithmetic encoded and which has been included in a bit stream including, as application information, information indicating that the binary data string has not been arithmetic encoded.

In this way decoder 200 is capable of adaptively switching whether or not to perform arithmetic decoding, and adaptively skipping arithmetic decoding. In addition, decoder 200 is capable of switching the first operation and the second operation according to application information. In addition, circuitry 260 is capable of performing the first operation and the second operation at different timings by switching the first operation and the second operation. It is to be noted that the first operation and the second operation performed by circuitry 260 can be also represented as a first driving operation and a second driving operation, respectively.

In addition, for example, circuitry 260 may switch between the first operation and the second operation according to information given from outside decoder 200, or according to information stored in decoder 200. In this way, circuitry 260 is capable of appropriately switching between the first operation and the second operation according to the information outside or inside decoder 200.

In addition, for example, circuitry 260 may switch between the first operation and the second operation in units of at least one entire picture. In this way, decoder 200 is capable of reducing increase in processing amount required for switching between the application states of arithmetic encoding.

In addition, for example, circuitry 260 may output a bit stream which includes application information indicating, in units of at least one entire picture, whether or not the binary data string has been arithmetic encoded. In other words, the application information may indicate, in units of at least one entire picture, whether the bit stream includes a binary data string which has been arithmetic encoded or a binary data string which has not been arithmetic encoded. In this way, decoder 200 is capable of reducing increase in coding amount and processing amount required for the application information.

[A Second Example of a Decoding Operation Performed by the Decoder]

Figure 19:
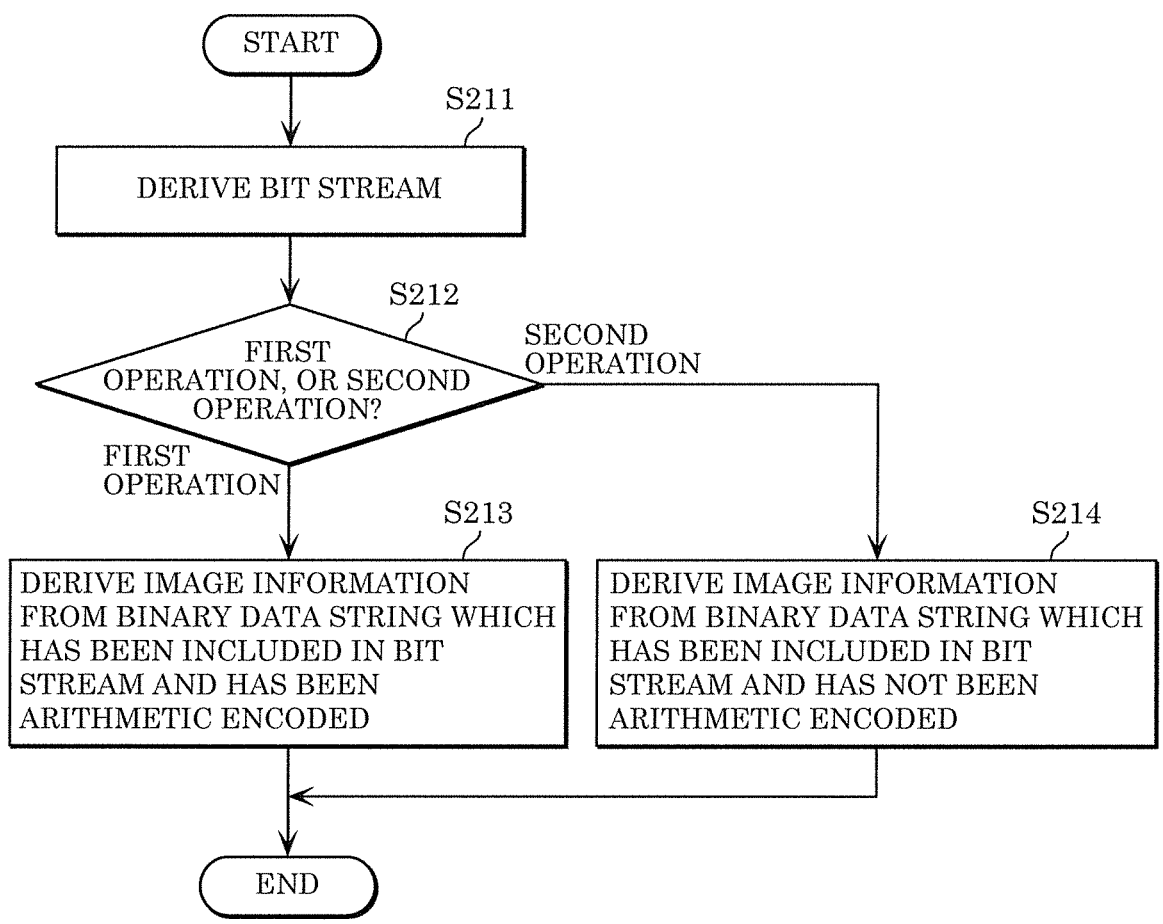
FIG. 19 is a flowchart indicating a second example of a decoding operation performed by the decoder according to Embodiment 1.

FIG. 19 is a flowchart indicating a second example of a decoding operation performed by decoder 200 according to Embodiment 1. For example, image information is decoded when the operation illustrated in FIG. 19 is performed by circuitry 260 of decoder 200 illustrated in FIG. 17.

As illustrated in FIG. 19, circuitry 260 obtains a bit stream including a binary data string derived from the image information according to binarization for arithmetic encoding (S211).

Circuitry 260 switches between a first operation and a second operation (S212). In the first operation, circuitry 260 derives image information from a binary data string which has been included in a bit stream and has been binary encoded (S213). In the second operation, circuitry 260 derives image information from a binary data string which has been included in a bit stream and has not been binary encoded (S214).

In this way, decoder 200 is capable of adaptively switching whether or not to perform arithmetic decoding, and adaptively skipping arithmetic decoding. Accordingly, decoder 200 can support reduction in processing delay generated by the arithmetic decoding. In addition, decoder 200 can effectively utilize inverse binarization resources for arithmetic decoding. In addition, circuitry 260 is capable of performing the first operation and the second operation at different timings by switching the first operation and the second operation.

It is to be noted that operations which are performed by decoder 200 include and are not always limited to the above-described operations such as the transform, quantization, prediction, etc. For example, decoder 200 does not need to perform the other operations. Even when the operations performed by decoder 200 are not limited to the above-described operations, decoder 200 is capable of supporting reduction in processing delay generated by arithmetic decoding.

Alternatively circuitry 260 outputs the bit stream which includes the binary data string and application information indicating whether or not the binary data string has been arithmetic encoded.

In the first operation, circuitry 260 may derive image information from a binary data string which has been arithmetic encoded and which has been included in a bit stream including, as application information, information indicating that the binary data string has been arithmetic encoded. In the second operation, circuitry 260 derives image information from a binary data string which has not been arithmetic encoded and which has been included in a bit stream including, as application information, information indicating that the binary data string has not been arithmetic encoded.

In this way, decoder 200 is capable of obtaining the bit stream including the application information for distinguishing the application state of arithmetic encoding, and deriving the image information therefrom. In addition, decoder 200 is capable of switching the first operation and the second operation according to the application information.

In addition, for example, circuitry 260 may switch between the first operation and the second operation according to information given from outside decoder 200, or according to information stored in decoder 200, as in the first example of the decoding operation.

In addition, for example, circuitry 260 may switch between the first operation and the second operation in units of at least one entire picture, as in the first example of the decoding operation. In addition, for example, circuitry 260 may output a bit stream which includes application information indicating, in units of at least one entire picture, whether or not a binary data string has been arithmetic encoded, as in the first example of the decoding operation.

[Supplement]

Encoder 100 and decoder 200 according to this embodiment is particularly applicable to real-time communication systems, etc. in which encoding and decoding are desired to be performed in a short time. Specifically encoder 100 and decoder 200 are applicable to teleconference systems, electronic mirrors, etc. For example, in these system environments, a second mode in which arithmetic encoding and arithmetic decoding are not performed.

In addition, whether or not to perform arithmetic encoding is switched in units of at least one entire picture. However, whether or not to perform arithmetic encoding may be switched in smaller unit. For example, arithmetic encoding and arithmetic decoding may be skipped for data having a particular data type. More specifically, arithmetic encoding and arithmetic decoding may be skipped instead of bypass arithmetic encoding and bypass arithmetic decoding.

In addition, for example, switching between context arithmetic encoding, bypass arithmetic encoding, and arithmetic encoding may be performed. Likewise, switching between context arithmetic decoding, bypass arithmetic decoding, and arithmetic decoding may be performed.

In addition, application information indicating whether or not a binary data string has been arithmetic encoded may be represented by a 1-bit flag or in another form. For example, by adding information indicating that a binary data string has been arithmetic encoded to a bit stream, the bit stream can include additional information as application information. Alternatively by adding information indicating that a binary data string has not been arithmetic encoded to a bit stream, the bit stream can include additional information as application information.

In addition, the application information may be included in the bit stream as information common to the other information. For example, when information indicating the type of a picture has been included in the bit stream and whether or not to perform arithmetic encoding is switched according to the type of the picture, the information indicating the type of the picture may be application information.

In addition, encoder 100 and decoder 200 can be used as an image encoder and an image decoder, respectively. Alternatively encoder 100 and decoder 200 can be used as an entropy encoder and an entropy decoder, respectively. In other words, encoder 100 and decoder 200 may correspond only to entropy encoder 110 and entropy decoder 202, respectively.

In addition, in each of the above embodiments, each of the constituent elements may be configured as exclusive hardware or may be implemented by executing a software program suitable for the constituent element. Each constituent element may be implemented by means of a program executing unit that is for example a CPU or a processor reading and executing a software program stored in a recording medium that is for example a hard disc or semiconductor memory.

More specifically, each of encoder 100 and decoder 200 may include processing circuitry and storage which is electrically connected to the processing circuitry and accessible from the processing circuitry. For example, the processing circuitry corresponds to circuitry 160 or 260, and the storage corresponds to memory 162 or 262.

The processing circuitry includes at least one of the exclusive hardware and the program executing unit, and executes the processing using the storage. In addition, when the processing circuitry includes the program executing unit, the storage stores a software program which is executed by the program executing unit.

Here, the software for implementing encoder 100, decoder 200, or the like according to this embodiment includes programs as indicated below.

The programs include a program for causing a computer to execute an encoding method which is for encoding image information and includes: deriving, from the image information, a binary data string according to binarization for arithmetic encoding; and outputting a bit stream including the binary data string and application information indicating whether or not the binary data string has been arithmetic encoded, wherein a string output as the bit stream includes: as the binary data string, a data string which has not been arithmetic encoded; and, as the application information, information indicating that the binary data string has not been arithmetic encoded.

The programs include a program for causing a computer to execute an encoding method which is for encoding image information and includes: deriving, from the image information, a binary data string according to binarization for arithmetic encoding; and outputting a bit stream including the binary data string, wherein a first operation and a second operation is switched, the first operation being for outputting, as the bit stream, a first bit stream including, as the binary data string, a first binary data string which has been arithmetic encoded, the second operation being for outputting, as the bit stream, a second bit stream including, as the binary data string, a second binary data string which has not been arithmetic encoded.

The programs include a program for causing a computer to execute a decoding method which is for decoding image information and includes: obtaining a bit stream which includes: a binary data string which has been derived from the image information according to binarization for arithmetic encoding; and application information indicating whether or not the binary data string has been arithmetic encoded; and deriving the image information from a data string which has not been arithmetic encoded and which has been included as the binary data string in the bit stream including, as the application information, information indicating that the binary data string has not been arithmetic encoded.

The programs include a program for causing a computer to execute a decoding method which is for decoding image information and includes: obtaining a bit stream including a binary data string derived from the image information according to binarization for arithmetic encoding; and deriving the image information from the binary data string, wherein a first operation and a second operation is switched, the first operation being for deriving the image information from a first binary data string which has been arithmetic encoded and included as the binary data string in the bit stream, the second operation being for deriving the image information from a second binary data string which has not been arithmetic encoded and which has been included as the binary data string in the bit stream.

In addition, the constituent elements may be the circuitry as described above. The circuitry may be configured as a single circuit as a whole, or as separate circuits. In addition, each constituent element may be implemented as a general processor, or an exclusive processor.

In addition, the processing which is executed by a particular one of the constituent elements may be executed by another one of the constituent elements. In addition, the execution order of the processes may be modified, or two or more of the processes may be executed in parallel. In addition, an encoder and decoder may include encoder 100 and decoder 200.

The ordinal numbers such as first, second, etc. used for explanation may be arbitrarily replaced. In addition, an ordinal number may be newly added to a given one of the constituent elements, or the like, or the ordinal number of a given one of the constituent elements, or the like may be removed.

Encoder 100 and decoder 200 according to one or more aspects have been described above based on the embodiments, the present disclosure is not limited to these embodiments. The one or more aspects of the present disclosure may encompass embodiments obtainable by adding various kinds of modifications that any person skilled in the art would arrive at to the embodiments and embodiments configurable by combining constituent elements in different embodiments within the scope of the present disclosure.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoding device that employs the image encoding method, an image decoding device that employs the image decoding method, and an image encoding/decoding device that includes both the image encoding device and the image decoding device. Other configurations included in the system may be modified on a case-by-case basis.

[Usage Examples]

Figure 20:
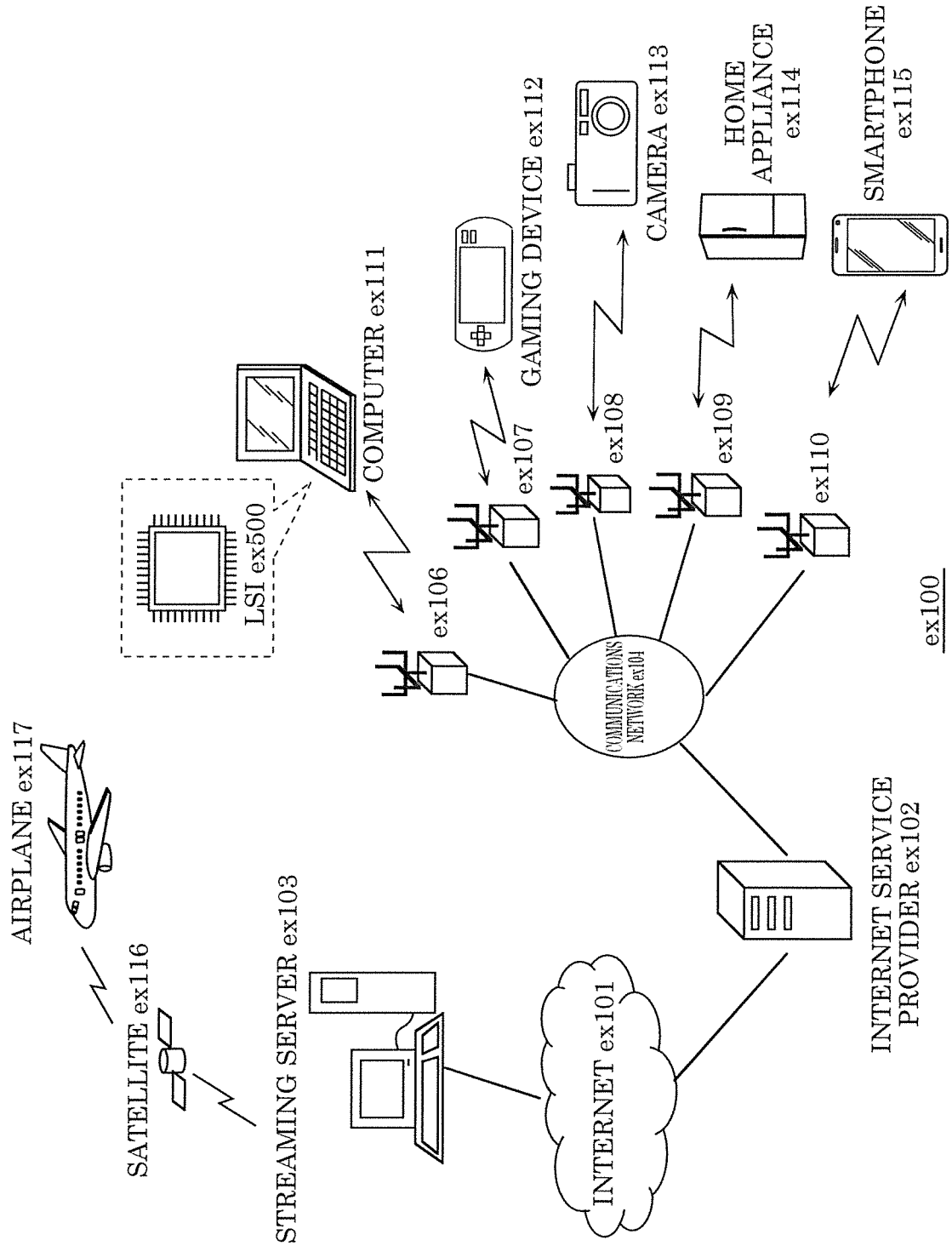
FIG. 20 illustrates an overall configuration of a content providing system for implementing a content distribution service.

FIG. 20 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoding device according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoding device according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoding device may obtain or store virtual object information and three-dimensional data, generate two-dimensional images based on movement from the perspective of the user, and then generate superimposed data by seamlessly connecting the images. Alternatively, the decoding device may transmit, to the server, motion from the perspective of the user in addition to a request for virtual object information, and the server may generate superimposed data based on three-dimensional data stored in the server in accordance with the received motion, and encode and stream the generated superimposed data to the decoding device. Note that superimposed data includes, in addition to RGB values, an a value indicating transparency; and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoding device or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 21:
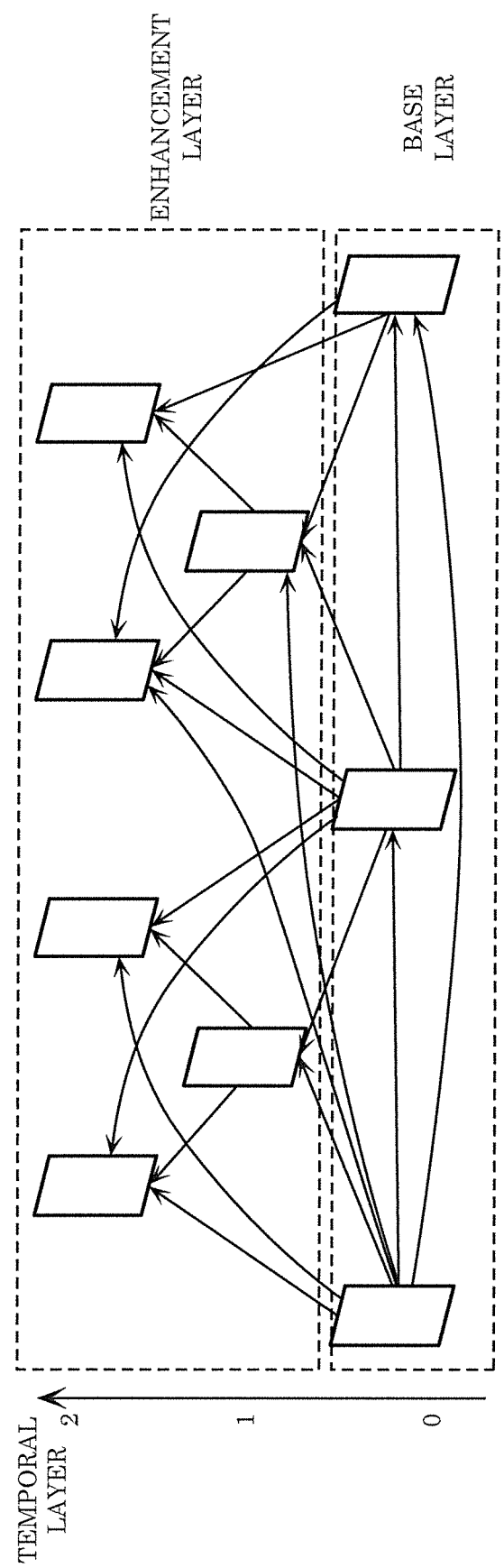
FIG. 21 illustrates one example of encoding structure in scalable encoding.

The switching of content will be described with reference to a scalable stream, illustrated in FIG. 21, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 21. Note that there may be a plurality of individual streams that are of the same content but different quality. In other words, by determining which layer to decode up to based on internal factors, such as the processing ability on the decoding device side, and external factors, such as communication bandwidth, the decoding device side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoding device side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 22:
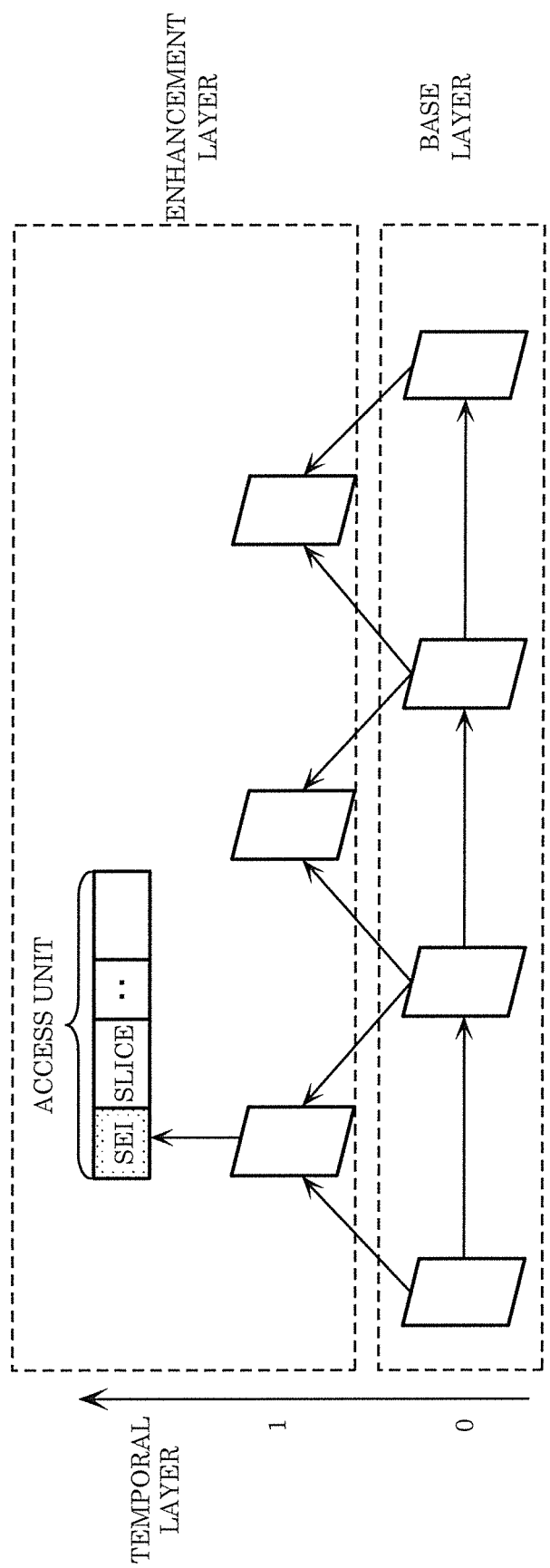
FIG. 22 illustrates one example of encoding structure in scalable encoding.

Alternatively a configuration in which a picture is divided into, for example, tiles in accordance with the meaning of, for example, an object in the image, and on the decoding device side, only a partial region is decoded by selecting a tile to decode, is also acceptable. Moreover, by storing an attribute about the object (person, car, ball, etc.) and a position of the object in the video (coordinates in identical images) as metadata, the decoding device side can identify the position of a desired object based on the metadata and determine which tile or tiles include that object. For example, as illustrated in FIG. 22, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoding device side can obtain, for example, the time at which a specific person appears in the video, and by fitting that with picture unit information, can identify a picture in which the object is present and the position of the object in the picture.

[Web Page Optimization.]

Figure 23:
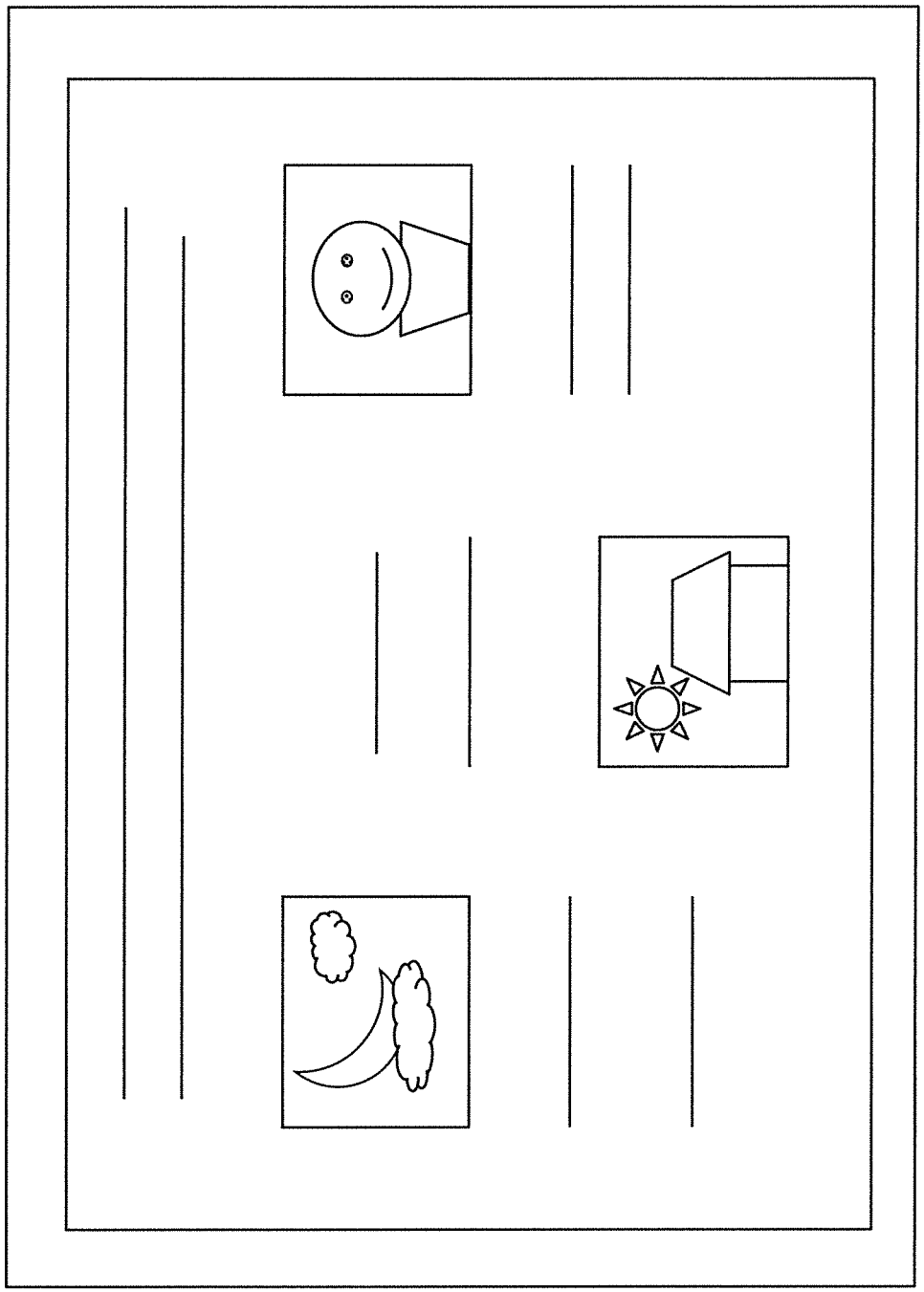
FIG. 23 illustrates an example of a display screen of a web page.
Figure 24:
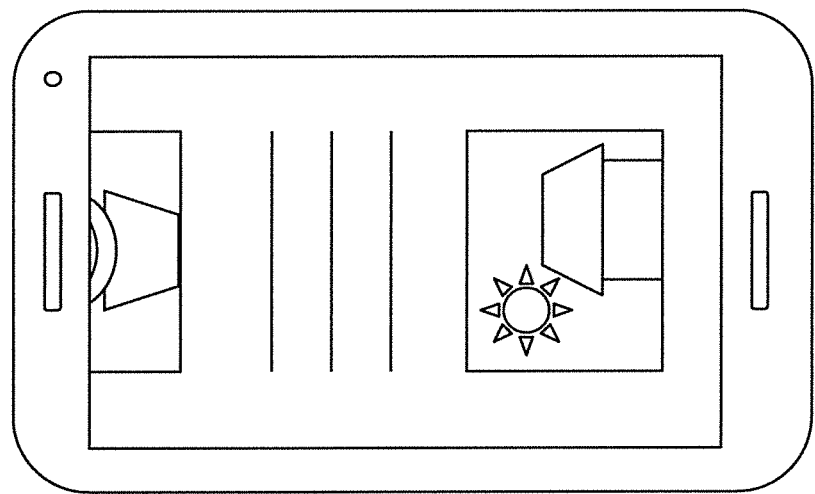
FIG. 24 illustrates an example of a display screen of a web page.

FIG. 23 illustrates an example of a display screen of a web page on, for example, computer ex111. FIG. 24 illustrates an example of a display screen of a web page on, for example, smartphone ex115. As illustrated in FIG. 23 and FIG. 24, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoding device) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly in order to keep the content within a specific length that scales with the length of the original video, the server may, in addition to the low-priority scenes described above, automatically clip out scenes with low movement based on an image processing result. Alternatively the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively as pre- or post-processing for encoding, the user may specify, for copyright reasons, a region of an image including a person or a region of the background be processed, and the server may process the specified region by for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoding device first receives the base layer as the highest priority and performs decoding and reproduction, although this may differ depending on bandwidth. When the content is reproduced two or more times, such as when the decoding device receives the enhancement layer during decoding and reproduction of the base layer and loops the reproduction, the decoding device may reproduce a high image quality video including the enhancement layer.

If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoding device (image encoding device) or the moving picture decoding device (image decoding device) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 25:
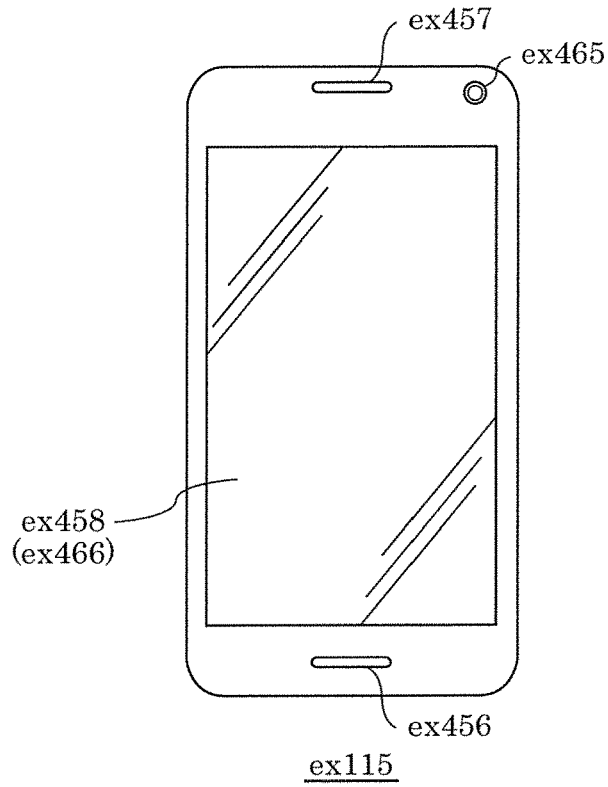
FIG. 25 illustrates one example of a smartphone.
Figure 26:
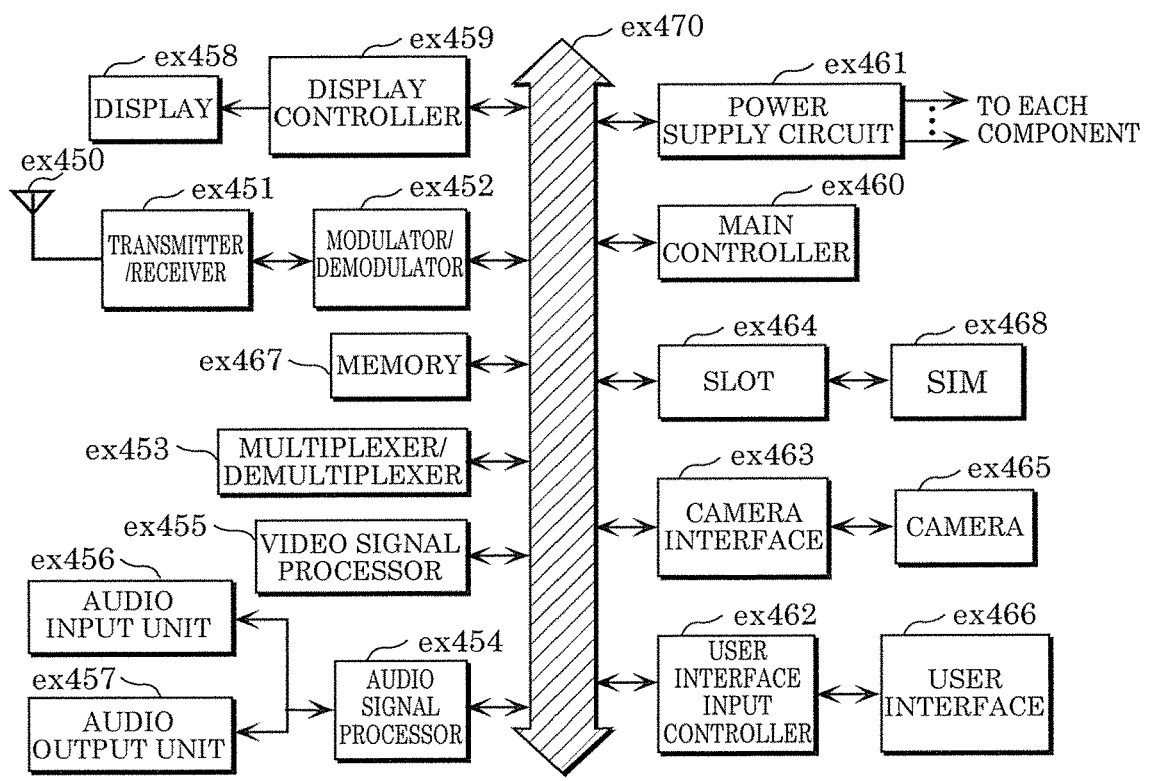
FIG. 26 is a block diagram illustrating a configuration example of a smartphone.

FIG. 25 illustrates smartphone ex115. FIG. 26 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory assay be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoding device and a decoding device; a transmitter terminal including only an encoding device; and a receiver terminal including only a decoding device. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconference systems, electronic mirrors, etc.

What is claimed is:

1. An encoder which encodes image information, the encoder comprising:
   memory; and
   circuitry which is accessible to the memory and which:
   derives, from the image information, a binary data string according to binarization for arithmetic encoding; and
   outputs a bit stream including the binary data string,
   wherein the circuitry switches between a first operation and a second operation, the first operation being for outputting, as the bit stream, a first bit stream which includes, as the binary data string, a first binary data string which has been arithmetic encoded, the second operation being for outputting, as the bit stream, a second bit stream which includes, as the binary data string, a second binary data string which has not been arithmetic encoded,
   in the arithmetic encoding, context adaptive arithmetic encoding which is performed according to a variable occurrence probability and bypass arithmetic encoding which is performed according to a fixed occurrence probability are switched according to a data type,
   an operation is fixed to one of the first operation and the second operation when a predetermined profile out of a plurality of profiles defined in a coding standard is used to encode the image information,
   when the operation is not fixed to one of the first operation and the second operation, the bit stream includes application information indicating whether or not the arithmetic encoding has been applied to the binary data string, and
   when the operation is fixed to one of the first operation and the second operation, the bit stream does not include the application information.

2. The encoder according to claim 1,
   wherein the circuitry:
   outputs the bit stream including the binary data string and application information indicating whether or not the binary data string has been arithmetic encoded,
   wherein the circuitry switches between a first operation and a second operation, the first operation being for outputting, as the bit stream, a first bit stream including: as the binary data string, a first binary data string which has been arithmetic encoded; and, as the application information, first information indicating that the binary data string has been arithmetic encoded, the second operation being for outputting, as the bit stream, a second bit stream including: as the binary data string, a second binary data string which has not been arithmetic encoded; and, as the application information, second information indicating that the binary data string has not been arithmetic encoded.

3. The encoder according to claim 1,
   wherein the circuitry switches between the first operation and the second operation in units of at least one entire picture.

4. The encoder according to claim 1,
   wherein the circuitry switches between the first operation and the second operation in units of at least one entire slice.

5. A decoder which decodes image information, the decoder comprising:
   memory; and
   circuitry which is accessible to the memory and which:
   obtains a bit stream including a binary data string derived from the image information according to binarization for arithmetic encoding; and
   derives the image information from the binary data string,
   wherein the circuitry switches between a first operation and a second operation, the first operation being for deriving the image information from a first binary data string which has been arithmetic encoded and which has been included as the binary data string in the bit stream, the second operation being for deriving the image information from a second binary data string which has not been arithmetic encoded and which has been included as the binary data string in the bit stream,
   in the arithmetic encoding, context adaptive arithmetic encoding which is performed according to a variable occurrence probability and bypass arithmetic encoding which is performed according to a fixed occurrence probability are switched according to a data type,
   an operation is fixed to one of the first operation and the second operation when a predetermined profile out of a plurality of profiles defined in a coding standard is used to decode the image information,
   when the operation is not fixed to one of the first operation and the second operation, the bit stream includes application information indicating whether or not the arithmetic encoding has been applied to the binary data string, and
   when the operation is fixed to one of the first operation and the second operation, the bit stream does not include the application information.

6. The decoder according to claim 5,
wherein the circuitry:
obtains the bit stream including the binary data string and application information indicating whether or not the binary data string has been arithmetic encoded; and
switches between the first operation and the second operation, the first operation being for deriving the image information from the first binary data string which has been arithmetic encoded and which has been included as the binary data string in the bit stream which includes, as the application information, first information indicating that the binary data string has been arithmetic encoded, the second operation being for deriving the image information from the second binary data string which has not been arithmetic encoded and which has been included as the binary data string in the bit stream which includes, as the application information, second information indicating that the binary data string has not been arithmetic encoded.

7. The decoder according to claim 5,
wherein the circuitry switches between the first operation and the second operation in units of at least one entire picture.

8. The decoder according to claim 5,
wherein the circuitry switches between the first operation and the second operation in units of at least one entire slice.

9. An encoding method for encoding image information, the encoding method comprising:
deriving, from the image information, a binary data string according to binarization for arithmetic encoding; and
outputting a bit stream including the binary data string,
wherein a first operation and a second operation is switched, the first operation being for outputting, as the bit stream, a first bit stream including, as the binary data string, a first binary data string which has been arithmetic encoded, the second operation being for outputting, as the bit stream, a second bit stream including, as the binary data string, a second binary data string which has not been arithmetic encoded,
in the arithmetic encoding, context adaptive arithmetic encoding which is performed according to a variable occurrence probability and bypass arithmetic encoding which is performed according to a fixed occurrence probability are switched according to a data type,
an operation is fixed to one of the first operation and the second operation when a predetermined profile out of a plurality of profiles defined in a coding standard is used to encode the image information,
when the operation is not fixed to one of the first operation and the second operation, the bit stream includes application information indicating whether or not the arithmetic encoding has been applied to the binary data string, and
when the operation is fixed to one of the first operation and the second operation, the bit stream does not include the application information.

10. A decoding method for decoding image information, the decoding method comprising:
obtaining a bit stream including a binary data string derived from the image information according to binarization for arithmetic encoding; and
deriving the image information from the binary data string,
wherein a first operation and a second operation is switched, the first operation being for deriving the image information from a first binary data string which has been arithmetic encoded and included as the binary data string in the bit stream, the second operation being for deriving the image information from a second binary data string which has not been arithmetic encoded and which has been included as the binary data string in the bit stream,
in the arithmetic encoding, context adaptive arithmetic encoding which is performed according to a variable occurrence probability and bypass arithmetic encoding which is performed according to a fixed occurrence probability are switched according to a data type,
an operation is fixed to one of the first operation and the second operation when a predetermined profile out of a plurality of profiles defined in a coding standard is used to decode the image information,
when the operation is not fixed to one of the first operation and the second operation, the bit stream includes application information indicating whether or not the arithmetic encoding has been applied to the binary data string, and
when the operation is fixed to one of the first operation and the second operation, the bit stream does not include the application information.

* * * * *